(12) United States Patent
Zhao et al.

(10) Patent No.: US 12,202,314 B2
(45) Date of Patent: Jan. 21, 2025

(54) ELECTRIC VEHICLE, THERMAL MANAGEMENT SYSTEM, AND METHOD FOR CONTROLLING SAME

(71) Applicant: CONTEMPORARY AMPEREX TECHNOLOGY (HONG KONG) LIMITED, Hong Kong (CN)

(72) Inventors: Yu Zhao, Ningde (CN); Yao Liu, Ningde (CN); Zhengzhu Zhou, Ningde (CN); Liwen Jiang, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 214 days.

(21) Appl. No.: 18/087,716

(22) Filed: Dec. 22, 2022

(65) Prior Publication Data

US 2023/0191870 A1  Jun. 22, 2023

Related U.S. Application Data

(63) Continuation of application No. PCT/CN2022/091139, filed on May 6, 2022.

(30) Foreign Application Priority Data

Dec. 20, 2021 (CN) .......................... 202123215232.3

(51) Int. Cl.
*B60H 1/00* (2006.01)
*B60H 1/14* (2006.01)
(Continued)

(52) U.S. Cl.
CPC ..... *B60H 1/00392* (2013.01); *B60H 1/00485* (2013.01); *B60H 1/00899* (2013.01);
(Continued)

(58) Field of Classification Search
CPC .............. B60H 1/00392; B60H 1/3228; B60H 1/00485; B60H 1/00899; B60H 1/143;
(Continued)

(56) References Cited

U.S. PATENT DOCUMENTS

| 11,091,007 B2 * | 8/2021 | Ferraris .................... B60K 1/00 |
| 2015/0143826 A1 | 5/2015 | Lingelbach |

(Continued)

FOREIGN PATENT DOCUMENTS

| CN | 106004337 A | 10/2016 |
| CN | 108482064 A | 9/2018 |

(Continued)

OTHER PUBLICATIONS

Contemporary Amperex Technology Co., Limited, International Search Report and Written Opinion, PCTCN2022091139, Aug. 22, 2022, 16 pgs.

(Continued)

*Primary Examiner* — Nelson J Nieves
(74) *Attorney, Agent, or Firm* — Kilpatrick Townsend & Stockton LLP

(57) ABSTRACT

This application relates to an electric vehicle, a thermal management system, and a method for controlling same. The thermal management system includes: a passenger compartment thermal management subsystem, including a compressor, a first throttle, and an evaporator configured to refrigerate the passenger compartment, where the compressor, the first throttle, and the evaporator are controlled to communicate with each other in sequence to form a first refrigerant circuit, the passenger compartment thermal management subsystem further includes a condenser, and the condenser is disposed between the compressor and the first throttle and able to exchange heat with the first refrigerant circuit; a heat emitting component thermal management (Continued)

subsystem, including a heat emitting component and a cooling water tank configured to cool the heat emitting component, and a control valve system, connected to the passenger compartment thermal management subsystem and the heat emitting component thermal management subsystem.

20 Claims, 19 Drawing Sheets

(51) Int. Cl.
    *B60H 1/32*         (2006.01)
    *B60K 1/00*         (2006.01)
(52) U.S. Cl.
    CPC ........... *B60H 1/143* (2013.01); *B60H 1/3228* (2019.05); *B60K 2001/005* (2013.01)
(58) Field of Classification Search
    CPC ....................... B60H 1/00885; B60H 1/00278; B60H 1/323; B60K 2001/005; B60K 11/02
    See application file for complete search history.

(56) References Cited

U.S. PATENT DOCUMENTS

| | | | |
|---|---|---|---|
| 2018/0312035 A1 | 11/2018 | Koberstein et al. | |
| 2019/0351740 A1* | 11/2019 | Filipkowski | B60H 1/32284 |
| 2021/0001688 A1* | 1/2021 | Kim | B60H 1/143 |
| 2021/0053412 A1* | 2/2021 | Kim | B60H 1/3222 |
| 2021/0061067 A1* | 3/2021 | Kim | B60H 1/32281 |
| 2021/0146753 A1 | 5/2021 | Lee et al. | |
| 2021/0379960 A1 | 12/2021 | Kim | |
| 2022/0041031 A1* | 2/2022 | Huang | B60L 58/27 |
| 2022/0111698 A1* | 4/2022 | Kim | B60H 1/00007 |
| 2022/0258558 A1* | 8/2022 | Lee | B60H 1/00921 |
| 2022/0258570 A1* | 8/2022 | Ishizeki | B60H 1/00385 |
| 2022/0355648 A1* | 11/2022 | Kim | B60H 1/143 |
| 2022/0379681 A1* | 12/2022 | Kim | B60H 1/00485 |

FOREIGN PATENT DOCUMENTS

| | | |
|---|---|---|
| CN | 208797144 U | 4/2019 |
| CN | 210000061 U | 1/2020 |
| CN | 110816207 A | 2/2020 |
| CN | 110949182 A | 4/2020 |
| CN | 111746218 A | 10/2020 |
| CN | 112109521 A | 12/2020 |
| CN | 113212104 A | 8/2021 |
| EP | 3922493 A1 | 12/2021 |
| JP | 2014043181 A | 3/2014 |
| JP | 2015154521 A | 8/2015 |
| JP | 2019027601 A | 2/2019 |
| JP | 2020199871 A | 12/2020 |
| KR | 20190051742 A | 5/2019 |
| KR | 20210059276 A | 5/2021 |
| WO | 2015133083 A1 | 9/2015 |

OTHER PUBLICATIONS

The extended European search report received in the corresponding European application 22790438.0, mailed Nov. 30, 2023.
The Notice of Reasons for Refusal received in the corresponding Japanese application 2022-570381, mailed on Mar. 11, 2024.
Decision to Grant a Patent received in the corresponding Japanese application 2022-570381, mailed on Aug. 13, 2024.
Notice of Preliminary Rejection received in the corresponding Korean application 10-2022-7039748, mailed on Sep. 11, 2024.

* cited by examiner

ELECTRIC VEHICLE, THERMAL MANAGEMENT SYSTEM, AND METHOD FOR CONTROLLING SAME

CROSS-REFERENCE TO RELATED APPLICATIONS

This application is a continuation application of PCT Patent Application No. PCT/CN2022/091139, entitled "ELECTRIC VEHICLE, THERMAL MANAGEMENT SYSTEM, AND METHOD FOR CONTROLLING SAME" filed on May 6, 2022, which claims priority to Chinese Patent Application No. 202123215232.3, entitled "THERMAL MANAGEMENT SYSTEM AND NEW ENERGY VEHICLE" filed on Dec. 20, 2021, both of which are incorporated herein by reference in their entirety.

TECHNICAL FIELD

This application relates to the technical field of electric vehicles, and in particular, to an electric vehicle, a thermal management system, and a method for controlling same.

BACKGROUND

Energy conservation and emission reduction is key to sustainable development of the automobile industry. Electric vehicles have become an important part of the sustainable development of the automobile industry by virtue of energy saving and environmental friendliness. With the popularization of electric vehicles, higher requirements are imposed on thermal management of a vehicle.

However, a thermal management system of a conventional electric vehicle is not well configured, resulting in severe waste of heat of the vehicle and being adverse to energy saving of the electric vehicle.

SUMMARY

In view of the situation above, this application provides an electric vehicle, a thermal management system, and a method for controlling same, so as to solve the problem of severe waste of heat.

According to a first aspect, this application provides a thermal management system, applied to an electric vehicle. The electric vehicle includes a passenger compartment. The thermal management system includes:

a passenger compartment thermal management subsystem, including a compressor, a first throttle, and an evaporator configured to refrigerate the passenger compartment, where the compressor, the first throttle, and the evaporator are controlled to communicate with each other in sequence to form a first refrigerant circuit; the passenger compartment thermal management subsystem further includes a condenser, and the condenser is disposed between the compressor and the first throttle and able to exchange heat with the first refrigerant circuit;

a heat emitting component thermal management subsystem, including a heat emitting component and a cooling water tank configured to cool the heat emitting component; and a control valve system, connected to the passenger compartment thermal management subsystem and the heat emitting component thermal management subsystem, where the control valve system is able to control the cooling water tank and the condenser to communicate with each other to form a first cooling water circuit, and the first cooling water circuit is configured to cool the heat emitting component.

In the technical solutions of embodiments of this application, the control valve system enables communication between the cooling water tank in the heat emitting component thermal management subsystem and the condenser in the passenger compartment thermal management subsystem to form the first cooling water circuit. In this way, the first cooling water circuit can cool the heat emitting component. In addition, because water circulates in the first cooling water circuit, lower-temperature water is substituted cyclically in the condenser, so as to facilitate heat absorbing during heat exchange between the condenser and the first refrigerant circuit. To be specific, the cooling water tank not only serves as a radiator for the heat emitting component, but also serves as a radiator for the condenser, thereby avoiding the need of an additional radiator to cool the condenser, improving the degree of integration of the entire thermal management system, and reducing waste of heat. Moreover, because the condenser is refrigerated by water cooling, the refrigerant circuit is simplified compared to the arrangement in which the condenser is used as a part of the first refrigerant circuit in the prior art, thereby reducing the injection amount of the refrigerant and achieving the effect of energy saving.

The heat emitting component thermal management subsystem includes a motor thermal management subsystem, and the heat emitting component includes a motor; and/or the heat emitting component thermal management subsystem includes a power battery thermal management subsystem, and the heat emitting component includes a power battery.

The control valve system is able to control the first cooling water circuit to selectively cool the motor thermal management subsystem and/or the power battery thermal management subsystem.

The first cooling water circuit serves to cool the motor and/or the power battery, so that the temperature of the motor and/or the power battery can be lowered, thereby ensuring that the motor and/or the power battery operates within a temperature range suitable for normal operation.

In some embodiments, the motor thermal management subsystem further includes a first water pump. The first water pump is disposed in the first cooling water circuit, and is configured to provide a first flow force by which a water current flows in the first cooling water circuit. The first water pump is a machine for conveying water or pressurizing water. The first flow force provided by the first water pump can make the water circulate in the first cooling water circuit, thereby helping to dissipate heat of the heat emitting component and refrigerate the condenser.

In some embodiments, the heat emitting component thermal management subsystem further includes an electric control device configured to control the motor, and the control valve system enables the first cooling water circuit to cool the electric control device. An electric control device is cooled by the first cooling water circuit, so as to ensure that the electric control device operates within a temperature range suitable for normal operation, and avoid an excessive operating temperature of the electric control device.

In some embodiments, the passenger compartment thermal management subsystem further includes a second throttle and a cooler. The compressor and the second throttle are controlled to communicate with each other to form a second refrigerant circuit. The compressor includes an air outlet and a return air inlet connected to each other. The condenser is disposed between the air outlet and the second throttle and able to exchange heat with the second refrigerant circuit. The cooler is disposed between the return air inlet and the second throttle and able to exchange heat with the second refrigerant circuit.

The passenger compartment thermal management subsystem is connected to the power battery thermal management subsystem through the control valve system. Two ends of the cooler are controlled to communicate with each other to form a second cooling water circuit. The first cooling water circuit is configured to cool the motor, and the second cooling water circuit is configured to cool the power battery. Arranged in this way, the passenger compartment thermal management subsystem is integrated with the motor thermal management subsystem by means of the condenser, and is integrated with the power battery thermal management subsystem by means of the cooler, thereby further improving the degree of integration of the entire thermal management system and reducing waste of heat.

In some embodiments, the power battery thermal management subsystem includes a second water pump. The second water pump is disposed in the second cooling water circuit, and is configured to provide a second flow force by which a water current flows in the second cooling water circuit. The second water pump is a machine for conveying water or pressurizing water. The second flow force provided by the second water pump can make the water circulate in the second cooling water circuit, thereby helping to dissipate heat of the power battery.

In some embodiments, the passenger compartment thermal management subsystem, the power battery thermal management subsystem, and the motor thermal management subsystem are connected through the control valve system.

The control valve system enables the cooling water tank, the condenser, and the cooler to communicate with each other to form a third cooling water circuit, and the third cooling water circuit is configured to cool the motor and the power battery. In this way, the passenger compartment thermal management subsystem, the motor thermal management subsystem, and the power battery thermal management subsystem are integrated together to reduce waste of heat of the thermal management system.

In some embodiments, the motor thermal management subsystem further includes a first pipe, and the power battery thermal management subsystem further includes a second pipe.

The control valve system enables the first pipe to communicate with the second pipe to form a first heating water circuit. The first heating water circuit is able to transfer heat to and from the motor, heat the battery by using absorbed heat of the motor, and turn on communication between the cooler and the cooling water tank to form a fourth cooling water circuit configured to cool the cooling water tank. Arranged in this way, the power battery can be heated by the heat generated by the motor, thereby reducing the waste of heat. In addition, the cooler dissipates heat for the cooling water tank to further reduce the waste of heat.

In some embodiments, the condenser includes a first end and a second end that are connected to each other. The cooling water tank includes a third end and a fourth end that are connected to each other. The third end communicates with the first end. The cooler includes a fifth end and a sixth end that are connected to each other. The first pipe includes a seventh end and an eighth end that are connected to each other. The second pipe includes a ninth end and a tenth end that are connected to each other.

The control valve system includes a first control valve assembly and a second control valve assembly. The first control valve assembly includes five first ports that controllably communicate with each other, and the five first ports are connected to the first end, the second end, the seventh end, the fifth end, and the ninth end respectively. The second control valve assembly includes five second ports that controllably communicate with each other, and the five second ports communicate with the third end, the fourth end, the sixth end, the eighth end, and the tenth end respectively. The control valve system includes the first control valve assembly and the second control valve assembly, the first control valve assembly includes five controllably communicating first ports, and the second control valve assembly includes five controllably communicating second ports, thereby facilitating the formation of the first cooling water circuit, the second cooling water circuit, the third cooling water circuit, the fourth cooling water circuit, and the first heating water circuit.

In some embodiments, the first control valve assembly includes a first three-way valve and a first four-way valve. One of valve ports of the first three-way valve communicates with one of valve ports of the first four-way valve. The two first ports connected to the first end and the second end respectively are disposed at the first three-way valve. The remaining three first ports are disposed at the first four-way valve.

Alternatively, the first control valve assembly includes a first five-way valve, and the five first ports are disposed at the first five-way valve.

In some embodiments, the second control valve assembly includes a second three-way valve and a second four-way valve, one of valve ports of the second three-way valve communicates with one of valve ports of the second four-way valve, the two second ports connected to the third end and the fourth end respectively are disposed at the second three-way valve, and the remaining three second ports are disposed at the second four-way valve.

Alternatively, the second control valve assembly includes a second five-way valve, and the five second ports are disposed at the second five-way valve.

In some embodiments, the passenger compartment thermal management subsystem further includes a heater core configured to heat the passenger compartment. The control valve system turns on communication between the condenser and the heater core to form a second heating water circuit. When the control valve system turns on communication between the condenser and the heater core to form a second heating water circuit, the second heating water circuit can heat the passenger compartment, thereby improving comfort of the passenger compartment. In addition, because the water circulates in the condenser and the heater core, when the heater core heats the passenger compartment, the temperature of the water flowing in the heater core decreases, thereby achieving the effect of cooling the condenser.

In some embodiments, the passenger compartment thermal management subsystem further includes a heater. The heater is disposed in the second heating water circuit and located on a passageway along which a water current flows from the condenser to the heater core. The heater disposed increases the temperature of the water flowing from the condenser to the heater core, so as to ensure the heating effect.

In some embodiments, the control valve system includes a third three-way valve, the third three-way valve is disposed in the second heating water circuit and located on a passageway along which a water current flows from the condenser to the heater core.

Three valve ports of the third three-way valve are connected to the condenser, the cooling water tank, and the heater core respectively. In this way, by controlling the three valve ports of the third three-way valve to open or close, the communication between the condenser and the cooling water tank can be turned on or off, or the communication between the condenser and the heater core can be turned on or off.

In some embodiments, the control valve system causes the second heating water circuit to heat the power battery. To be specific, in a low-temperature scenario, the control valve system enables the second heating water circuit to heat the power battery, so that the temperature of the power battery is maintained within a temperature range suitable for normal operation, thereby taking full advantage of heat.

In some embodiments, the power battery thermal management subsystem includes a second pipe, and the second pipe is able to exchange heat with the power battery. The control valve system includes a fourth three-way valve, the fourth three-way valve is disposed in the second heating water circuit, and located on a passageway along which a water current flows from the heater core to the second pipe.

Three valve ports of the fourth three-way valve are connected to the heater core, the condenser, and one end of the second pipe respectively, and the other end of the second pipe is connected to the condenser. In this way, by controlling the three valve ports of the fourth three-way valve to open or close, the second heating water circuit is made to heat the power battery or not to heat the power battery.

In some embodiments, the passenger compartment thermal management subsystem further includes a third water pump. The third water pump is disposed in the second heating water circuit, and is configured to provide a third flow force by which a water current flows in the second heating water circuit. The third water pump is a machine for conveying water or pressurizing water. The third flow force provided by the third water pump can make the water circulate in the second heating water circuit, thereby helping to heat the passenger compartment.

In some embodiments, the passenger compartment thermal management subsystem further includes a dehydrator. The dehydrator is disposed in the first refrigerant circuit, located between the compressor and the first throttle, and configured to dry the refrigerant. The dehydrator serves to dry the refrigerant, and can filter out tiny impurities in the refrigerant circuit to facilitate the flow of the refrigerant and improve the operating performance of the passenger compartment thermal management subsystem.

In some embodiments, the heat emitting component thermal management subsystem further includes a cooling fan, and the cooling fan is disposed beside the cooling water tank and configured to cool the cooling water tank. In this way, the cooling fan can facilitate the flow of air and dissipate the heat of the cooling water tank into the air, thereby facilitating heat dissipation of the cooling water tank.

According to a second aspect, this application provides an electric vehicle, including a passenger compartment and the thermal management system according to the foregoing embodiment. The evaporator in the thermal management system is configured to refrigerate the passenger compartment.

According to a third aspect, this application provides a method for controlling a thermal management system, including steps of:

controlling, when an ambient temperature is lower than a first preset threshold, a compressor, a first throttle, and an evaporator to communicate in sequence to form a first refrigerant circuit configured to refrigerate a passenger compartment in an electric vehicle; and controlling a cooling water tank to communicate with a condenser to form a first cooling water circuit configured to cool a heat emitting component and the first refrigerant circuit.

The cooling water tank is configured to cool the heat emitting component, and the condenser is disposed between the compressor and the first throttle, and is able to exchange heat with the first refrigerant circuit.

In the technical solution according to this embodiment of this application, the first cooling water circuit can cool the heat emitting component. In addition, because water circulates in the first cooling water circuit, lower-temperature water is substituted cyclically in the condenser, so as to facilitate heat absorbing during heat exchange between the condenser and the first refrigerant circuit. To be specific, the cooling water tank not only serves as a radiator for the heat emitting component, but also serves as a radiator for the condenser, thereby avoiding the need of an additional radiator to cool the condenser, improving the degree of integration of the entire thermal management system, and reducing waste of heat. Moreover, because the condenser is refrigerated by water cooling, the refrigerant circuit is simplified compared to the arrangement in which the condenser is used as a part of the first refrigerant circuit in the prior art, thereby reducing the injection amount of the refrigerant and achieving the effect of energy saving.

In some embodiments, the first cooling water circuit is configured to cool a motor and/or a power battery. The first cooling water circuit serves to cool the motor and/or the power battery, so that the temperature of the motor and/or the power battery can be lowered, thereby ensuring that the motor and/or the power battery operates within a temperature range suitable for normal operation.

In some embodiments, the method further includes steps of:

controlling, when the ambient temperature is higher than a second preset threshold, the compressor and a second throttle to communicate with each other to form a second refrigerant circuit;

controlling formation of a second cooling water circuit between two ends of a cooler to cool a power battery, where the first cooling water circuit is configured to cool a motor; or controlling the cooler, the condenser, and the cooling water tank to communicate with each other to form a third cooling water circuit to cool the motor and the power battery, where, the second preset threshold is greater than the first preset threshold; the compressor includes an air outlet and a return air inlet connected to each other, the condenser is disposed between the air outlet and the second throttle and able to exchange heat with the second refrigerant circuit, and the cooler is disposed between the return air inlet and the second throttle and able to exchange heat with the second refrigerant circuit. Arranged in this way, the thermal management system is more integrated, so that the degree of integration of the entire thermal management system is further improved, and the waste of heat is reduced.

In some embodiments, the method further includes steps of:

controlling, when the ambient temperature is lower than a third preset threshold, the first refrigerant circuit to become cut-off, and controlling the condenser and a heater core to communicate with each other to form a second heating water circuit, where the heater core is configured to heat the passenger compartment; and controlling formation of the second cooling water circuit between two ends of the cooler to cool the power battery, where the cooling water tank is configured to cool the motor; or controlling formation of the second cooling water circuit between two ends of the cooler to cool the power battery and the motor, where, the third preset threshold is less than the first preset threshold. Arranged in this way, the passenger compartment thermal management subsystem is integrated with the motor thermal management subsystem by means of the condenser, and is integrated with the power battery thermal management subsystem by means of the cooler, thereby further improving the degree of integration of the entire thermal management system and reducing waste of heat.

In some embodiments, the thermal management system includes a first pipe and a second pipe, and the second heating water circuit is configured to heat the power battery.

The method further includes: controlling the first pipe and the second pipe to communicate with each other to form a first heating water circuit, where the cooling water tank communicates with the cooler to form a water circuit. Arranged in this way, the power battery can be heated by the heat generated by the motor, thereby reducing the waste of heat. In addition, the cooler dissipates heat for the cooling water tank to further reduce the waste of heat.

In some embodiments, the first refrigerant circuit is controlled to communicate, and the evaporator is configured to defrost the passenger compartment. In this way, when the second refrigerant circuit heats the passenger compartment, the first refrigerant circuit is available for dehumidifying the passenger compartment, so as to improve the comfort of the passenger compartment.

In some embodiments, the method further includes: controlling formation of a second cooling water circuit between two ends of a cooler to cool a power battery, where the first cooling water circuit is configured to cool a motor; or controlling the cooler, the condenser, and the cooling water tank to communicate with each other to form a third cooling water circuit to cool the motor and the power battery.

The condenser is configured to defrost the cooling water tank.

During heating of the passenger compartment, when the cooler absorbs heat from the environment through the cooling water tank, the surface of the cooling water tank is prone to frost up. Arranged in this way, hot water in the condenser can be passed into the cooling water tank to defrost the cooling water tank.

The foregoing description is merely an overview of the technical solutions of this application. The following expounds specific embodiments of this application to enable a clearer understanding of the technical means of this application, enable implementation thereof based on the content of the specification, and make the foregoing and other objectives, features, and advantages of this application more evident and comprehensible.

BRIEF DESCRIPTION OF DRAWINGS

By reading the following detailed description of embodiments, a person of ordinary skill in the art becomes clearly aware of various other advantages and benefits. The drawings are merely intended to illustrate the embodiments, but not intended to limit this application. In all the drawings, the same reference numeral represents the same component. In the drawings.

Figure 1:
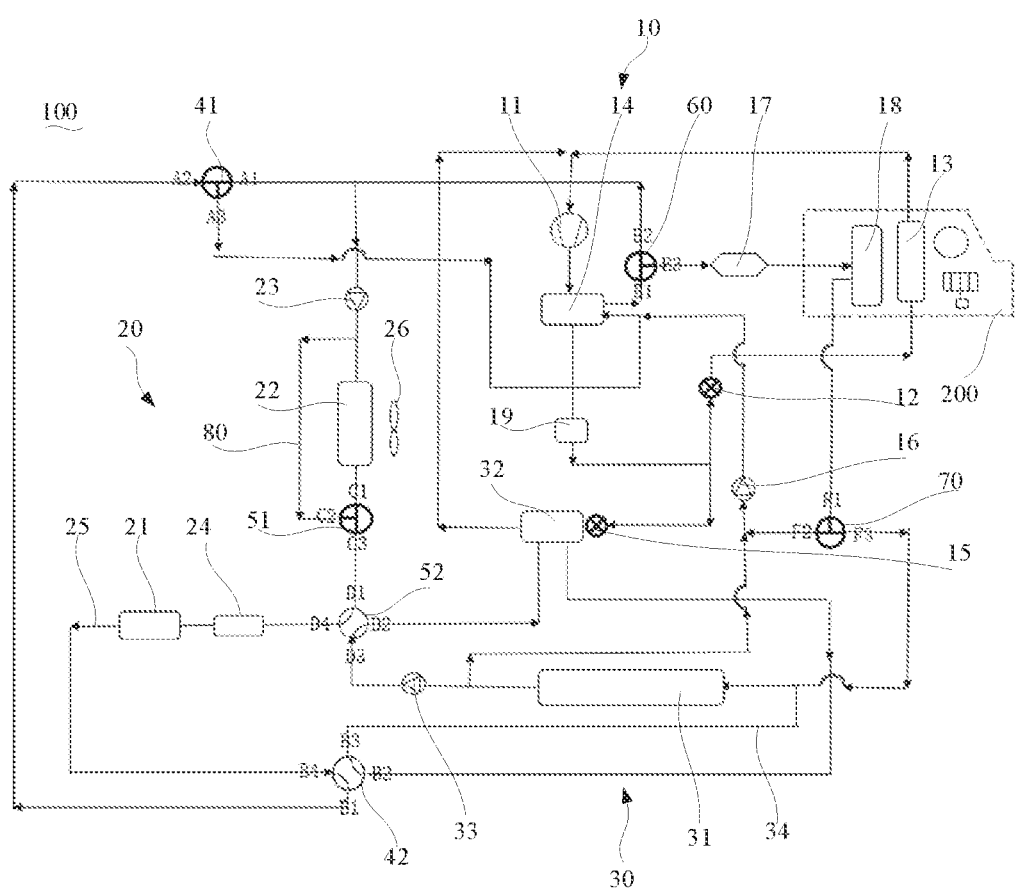
FIG. 1 is a schematic diagram of a thermal management system according to an embodiment of this application.

Reference numerals: 100. Thermal management system; 10. passenger compartment thermal management subsystem; 11. compressor; 12. first throttle; 13. evaporator; 14. condenser; 15. second throttle; 16. third water pump; 17. heater; 18. heater core; 19. dehydrator; 20. motor thermal management subsystem; 21. motor; 22. cooling water tank; 23. first water pump; 24. electric control device; 25. first pipe; 26. cooling fan; 30. power battery thermal management subsystem; 31. power battery; 32. cooler; 33. second water pump; 34. second pipe; 41. first three-way valve; 42.

first four-way valve; 43. first five-way valve; 51. second three-way valve; 52. second four-way valve; 53. second five-way valve; 60. third three-way valve; 70. fourth three-way valve; 80. bypass pipe; 200. passenger compartment.

DETAILED DESCRIPTION OF EMBODIMENTS

Embodiments of the technical solutions of this application are described in detail below with reference to the drawings. The following embodiments are merely intended to describe the technical solutions of this application more clearly, and are merely exemplary but without hereby limiting the protection scope of this application.

Unless otherwise defined, all technical and scientific terms used herein have the same meanings as usually understood by a person skilled in the technical field of this application. The terms used herein are merely intended for describing specific embodiments but are not intended to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish different objects but not intended to indicate or imply relative importance or implicitly specify the number of the indicated technical features, the specific order, or order of priority. In the description of the embodiments of this application, unless otherwise expressly specified, "a plurality of" means two or more.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in the embodiments of this application according to the context.

With popularization of electric vehicles, researchers have been pursuing high performance of energy conservation and emission reduction of the vehicles. For example, optimal utilization of heat by a thermal management system is being pursued. The optimal utilization of heat can improve the energy-saving performance of electric vehicles.

The applicant has noticed that a thermal management system generally includes a passenger compartment thermal management subsystem and a heat emitting component thermal management subsystem. The heat emitting component thermal management subsystem includes a motor thermal management subsystem and a power battery thermal management subsystem. Generally, the passenger compartment thermal management subsystem and the heat emitting component thermal management subsystem are stand-alone. In other words, the degree of integration is relatively low for the entire thermal management system. Therefore, the waste of heat is severe for the entire vehicle, thereby being adverse to energy conservation and emission reduction of electric vehicles.

To reduce the waste of heat, the applicant has found through research that the passenger compartment thermal management subsystem and the heat emitting component thermal management subsystem included in the thermal management system can be integrated. For example, the motor thermal management subsystem can be integrated with the power battery thermal management subsystem; or the motor thermal management subsystem can be integrated with the passenger compartment thermal management subsystem; or the passenger compartment thermal management subsystem can be integrated with the power battery thermal management subsystem; or the motor thermal management subsystem, the power battery thermal management subsystem, and the passenger compartment thermal management subsystem can be integrated together.

Based on the considerations above, in order to solve the problem of severe waste of heat in an electric vehicle, the applicant has designed a thermal management system after in-depth research. The thermal management system is applied to an electric vehicle, and the electric vehicle includes a passenger compartment. The thermal management system includes a passenger compartment thermal management subsystem and a heat emitting component thermal management subsystem. A condenser in the passenger compartment thermal management subsystem can exchange heat with a first refrigerant circuit in the subsystem, so as to reduce the temperature of a refrigerant in the first refrigerant circuit. In this way, the refrigerant circulates in the first refrigerant circuit to implement refrigeration in the passenger compartment. A control valve system can turn on communication between a cooling water tank of the heat emitting component thermal management subsystem and the condenser of the passenger compartment thermal management subsystem to form a first cooling water circuit. The first cooling water circuit can cool the heat emitting component. In addition, because water circulates in the first cooling water circuit, lower-temperature water is substituted cyclically in the condenser, so as to facilitate heat absorbing during heat exchange between the condenser and the first refrigerant circuit.

In a thermal management system arranged in this way, duration refrigeration of the passenger compartment, the cooling water tank not only serves as a radiator for the heat emitting component, but also serves as a radiator for the condenser, thereby avoiding the need of an additional radiator to cool the condenser, improving the degree of integration of the entire thermal management system, and reducing waste of heat. In addition, because the condenser is refrigerated by water cooling, the refrigerant circuit is simplified compared to the arrangement in which the condenser is used as a part of the first refrigerant circuit in the prior art, thereby reducing the injection amount of the refrigerant.

Figure 2:
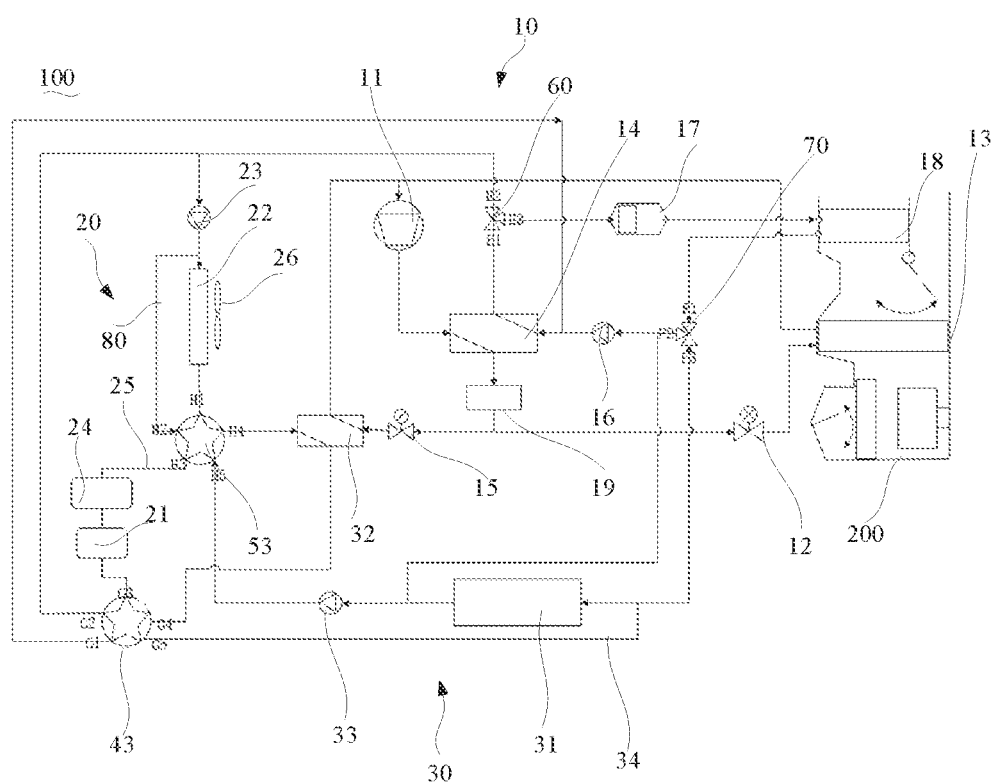
FIG. 2 is a schematic diagram of a thermal management system according to another embodiment of this application.

Referring to FIG. 1 and FIG. 2, this application provides a thermal management system 100, including a passenger compartment thermal management subsystem 10, a heat emitting component thermal management subsystem, and a control valve system. The control valve system is connected to the passenger compartment thermal management subsystem 10 and the heat emitting component thermal management subsystem. The passenger compartment thermal management subsystem 10 includes a compressor 11, a first throttle 12, and an evaporator 13. The evaporator 13 is configured to refrigerate a passenger compartment 200. The compressor 11, the first throttle 12, and the evaporator 13 are controlled to communicate with each other in sequence to form a first refrigerant circuit. The passenger compartment thermal management subsystem 10 further includes a condenser 14. The condenser 14 is disposed between the compressor 11 and the first throttle 12, and is able to exchange heat with the first refrigerant circuit. The heat emitting component thermal management subsystem includes a heat emitting component and a cooling water tank 22 configured to cool the heat emitting component. The control valve system is able to control the cooling water tank 22 and the condenser 14 to communicate with each other to form a first cooling water circuit. The first cooling water circuit is configured to cool the heat emitting component.

The passenger compartment thermal management subsystem 10 is configured to manage heat of the passenger compartment 200. The passenger compartment 200 can be cooled and/or heated by the passenger compartment thermal management subsystem 10. For example, in one circumstance, the passenger compartment thermal management subsystem 10 can only cool the passenger compartment 200, and this circumstance is: when the temperature in the passenger compartment 200 is relatively high, the passenger compartment thermal management subsystem 10 can lower the temperature in the passenger compartment 200. In another circumstance, the passenger compartment thermal management subsystem 10 can only heat the passenger compartment 200, and this circumstance is: when the temperature in the passenger compartment 200 is relatively low, the passenger compartment thermal management subsystem 10 can raise the temperature in the passenger compartment 200. In still another circumstance, the passenger compartment thermal management subsystem 10 can both cool the passenger compartment 200 and heat the passenger compartment 200. When the temperature in the passenger compartment 200 is relatively high, the passenger compartment thermal management subsystem 10 can lower the temperature in the passenger compartment 200; and, when the temperature in the passenger compartment 200 is relatively low, the passenger compartment thermal management subsystem 10 can raise the temperature in the passenger compartment 200.

The heat emitting component thermal management subsystem can manage the heat of a heat emitting component, for example, can cool the heat emitting component and/or heat the heat emitting component. In one circumstance, the heat emitting component thermal management subsystem can only cool the heat emitting component, and this circumstance is: when the temperature of the heat emitting component is relatively high, the heat emitting component thermal management subsystem can lower the temperature of the heat emitting component. In another circumstance, the heat emitting component thermal management subsystem can only heat the heat emitting component, and this circumstance is: when the temperature of the heat emitting component is relatively low, the heat emitting component thermal management subsystem can raise the temperature of the heat emitting component. In still another circumstance, the heat emitting component thermal management subsystem can both cool the heat emitting component and heat the heat emitting component. When the temperature of the heat emitting component is relatively high, the heat emitting component thermal management subsystem can lower the temperature of the heat emitting component; and, when the temperature of the heat emitting component is relatively low, the heat emitting component thermal management subsystem can raise the temperature of the heat emitting component.

The control valve system is configured to connect the passenger compartment thermal management subsystem 10 and the heat emitting component thermal management subsystem, so as to integrate the passenger compartment thermal management subsystem 10 and the heat emitting component thermal management subsystem to reduce waste of heat of the vehicle.

The compressor 11 is a source of motive power of a refrigeration cycle, and keeps rotating as driven by a motor. The compressor extracts vapor out of the evaporator 13 in time to maintain a low temperature and a low pressure. In addition, the compressor increases the pressure and temperature of refrigerant vapor by means of an compression effect, thereby creating conditions for transferring the heat of the refrigerant vapor to the external environment and media. The compressor can compress low-temperature low-pressure refrigerant vapor to a high-temperature high-pressure state.

The condenser 14 is a heat exchange device, and serves a function of taking away the heat of the high-temperature high-pressure refrigerant vapor that comes from the compressor 11, so that the high-temperature high-pressure refrigerant vapor is cooled and condensed into a high-pressure normal-temperature refrigerant liquid. In a specific embodiment, the condenser 14 is a plate heat exchanger. The plate heat exchanger is characterized by high heat-exchange efficiency, little loss of heat, structural compactness and lightness, little occupation of space, wide applicability, and a long service life.

The first throttle 12 depressurizes the high-pressure normal-temperature vapor to obtain a low-temperature low-pressure refrigerant, and feeds the refrigerant into the condenser 14 for evaporation.

The evaporator 13 is also a heat exchange device, in which the low-temperature low-pressure refrigerant formed by throttling evaporates, with the heat of the cooled material being absorbed. In other words, the low-temperature low-pressure refrigerant in the evaporator 13 can absorb the heat in the passenger compartment 200 to achieve the effect of lowering the air temperature in the passenger compartment 200.

When the passenger compartment 200 is being refrigerated, the compressor 11, the first throttle 12, and the evaporator 13 are controlled to communicate with each other in sequence to form a first refrigerant circuit. In this way, after being compressed by the compressor 11, the refrigerant is in a high-temperature high-pressure state. The high-temperature high-pressure refrigerant exchanges heat with the condenser 14 when flowing in the first refrigerant circuit. The condenser 14 takes away the heat of the high-temperature high-pressure refrigerant, so that the high-temperature high-pressure refrigerant vapor is cooled and condensed into a high-pressure normal-temperature refrigerant liquid. After being throttled by the first throttle 12, the high-pressure normal-temperature refrigerant becomes a low-temperature low-pressure refrigerant. The low-temperature low-pressure refrigerant evaporates in the evaporator 13, absorbs the heat of the air in the passenger compartment 200, and returns to the compressor 11, so as to achieve the effect of lowering the temperature in the passenger compartment 200.

It is hereby noted that, for ease of mounting, a refrigerant pipe is usually provided between the compressor 11 and the first throttle 12, between the first throttle 12 and the evaporator 13, and between the evaporator 13 and the compressor 11, separately, and every two thereof communicate with each other through the refrigerant pipe. In this case, the first refrigerant circuit further includes the refrigerant pipe. The condenser 14 can exchange heat with the refrigerant pipe disposed between the compressor 11 and the first throttle 12. To be specific, a cooling medium flowing in the condenser 14 can exchange heat with the refrigerant flowing in the refrigerant pipe.

The heat emitting component represents a component that can emit heat during operation. The cooling water tank 22 is filled with water. The water in the cooling water tank 22 can exchange heat with the heat emitting component to lower the temperature of the heat emitting component, so as to avoid overtemperature from affecting normal operation of the heat emitting component.

The control valve system controls the cooling water tank 22 and the condenser 14 to communicate with each other to form the first cooling water circuit. Generally, the cooling water tank 22 communicates with the condenser 14 through a water pipe. In this case, the first cooling water circuit further includes the water pipe. The heat emitting component can exchange heat with the water pipe. To be specific, the heat emitting component can exchange heat with the cooling medium (water) that flows in the water pipe.

In the thermal management system 100 above, the control valve system enables communication between the cooling water tank 22 in the heat emitting component thermal management subsystem and the condenser 14 in the passenger compartment thermal management subsystem 10 to form the first cooling water circuit. In this way, the first cooling water circuit can cool the heat emitting component. In addition, because water circulates in the first cooling water circuit, lower-temperature water is substituted cyclically in the condenser 14, so as to facilitate heat absorbing during heat exchange between the condenser 14 and the first refrigerant circuit. To be specific, the cooling water tank 22 not only serves as a radiator for the heat emitting component, but also serves as a radiator for the condenser 14, thereby avoiding the need of an additional radiator to cool the condenser 14, improving the degree of integration of the entire thermal management system 100, and reducing waste of heat. Moreover, because the condenser 14 is refrigerated by water cooling, the refrigerant circuit is simplified compared to the arrangement in which the condenser 14 is used as a part of the first refrigerant circuit in the prior art, thereby reducing the injection amount of the refrigerant and achieving the effect of energy saving.

According to some embodiments of this application, the heat emitting component thermal management subsystem includes a motor thermal management subsystem 20. In this case, the heat emitting component includes a motor 21, and the first cooling water circuit can cool the motor 21. In other embodiments, the heat emitting component thermal management subsystem includes a power battery thermal management subsystem 30. In this case, the heat emitting component includes a power battery 31, and the first cooling water circuit can cool the motor 21. In still other embodiments, the heat emitting component thermal management subsystem includes a motor thermal management subsystem 20 and a power battery thermal management subsystem 30, and the heat emitting component includes the motor 21 and the power battery 31. The first cooling water circuit can selectively cool the motor 21 and/or the power battery 31.

The power battery 31 is a power source of the electric vehicle, and the motor 21 can drive wheels of the electric vehicle to run. Specifically, during operation, the power battery 31 provides electrical energy to the motor 21. Through a drivetrain of the electric vehicle, the motor 21 drives the wheels to run.

The first cooling water circuit serves to cool the motor 21 and/or the power battery 31, so that the temperature of the motor 21 and/or the power battery 31 can be lowered, thereby ensuring that the motor 21 and/or the power battery 31 operates within a temperature range suitable for normal operation.

It is hereby noted that the cooling water tank 22 is a part of the motor thermal management subsystem 20. Understandably, in other embodiments, the cooling water tank 22 may serve as a part of the power battery thermal management subsystem 30 instead.

The motor thermal management subsystem 20 further includes a first water pump 23. The first water pump 23 is disposed in the first cooling water circuit, and is configured to provide a first flow force by which a water current flows in the first cooling water circuit. Specifically, the first water pump 23 is mounted on a water pipe included in the first cooling water circuit.

The first water pump 23 is a machine for conveying water or pressurizing water. The first flow force provided by the first water pump 23 can make the water circulate in the first cooling water circuit, thereby helping to dissipate heat of the heat emitting component and refrigerate the condenser 14.

The heat emitting component thermal management subsystem further includes an electric control device 24 configured to control the motor 21. That is, the heat emitting component further includes the electric control device 24. The control valve system enables the first cooling water circuit to cool the electric control device 24. Specifically, the electric control device 24 is a part of the motor thermal management subsystem 20, and the electric control device 24 is configured to control the operation of the motor 21.

The electric control device 24 is cooled by the first cooling water circuit, so as to ensure that the electric control device 24 operates within a temperature range suitable for normal operation, and avoid an excessive operating temperature of the electric control device 24.

According to some embodiments of this application, the passenger compartment thermal management subsystem 10 further includes a second throttle 15 and a cooler 32. The compressor 11 and the second throttle 15 are controlled to communicate with each other to form a second refrigerant circuit. The compressor 11 includes an air outlet and a return air inlet that are connected to each other. The high-temperature high-pressure refrigerant flows out of the compressor 11 from the air outlet, and the low-temperature low-pressure refrigerant returns to the compressor 11 from the return air inlet. The condenser 14 is disposed between the air outlet and the second throttle 15 and able to exchange heat with the second refrigerant circuit. The cooler 32 is disposed between the return air inlet and the second throttle 15 and able to exchange heat with the second refrigerant circuit. The passenger compartment thermal management subsystem 10 is connected to the power battery thermal management subsystem 30 through the control valve system. Two ends of the cooler 32 are controlled to communicate with each other to form a second cooling water circuit. The first cooling water circuit is configured to cool the motor 21, and the second cooling water circuit is configured to cool the power battery 31.

The second throttle 15 depressurizes the high-pressure normal-temperature vapor to obtain a low-temperature low-pressure refrigerant, and the refrigerant flows to the condenser 32 for evaporation.

The cooler 32 is also a heat exchange device. The low-temperature low-pressure refrigerant formed by throttling evaporates through heat exchange with the cooler, so that the heat of the cooled material is absorbed. To be specific, the refrigerant that exchanges heat with the cooler 32 can absorb the heat of the water in the cooler 32 to achieve the effect of lowering the temperature of the water in the cooler 32. Specifically, the cooler 32 is a plate heat exchanger.

In a case of cooling the power battery 31, the compressor 11 and the second throttle 15 are controlled to communicate with each other to form a second refrigerant circuit. In this way, after being compressed by the compressor 11, the refrigerant is in a high-temperature high-pressure state. The high-temperature high-pressure refrigerant exchanges heat with the condenser 14 when flowing in the second refrigerant circuit. The condenser 14 takes away the heat of the high-temperature high-pressure refrigerant, so that the high-temperature high-pressure refrigerant vapor is cooled and condensed into a high-pressure normal-temperature refrigerant liquid. After being throttled by the second throttle 15, the high-pressure normal-temperature refrigerant becomes a low-temperature low-pressure refrigerant. The low-temperature low-pressure refrigerant absorbs the heat of the water in the cooler 32 when passing through the cooler 32, and then returns to the compressor 11, so as to achieve the effect of lowering the temperature of the water in the cooler 32.

Identical to that in the first refrigerant circuit, a refrigerant pipe is usually provided between the compressor 11 and the second throttle 15 as a means to turn on communication between the compressor and the second throttle. In this case, the second refrigerant circuit further includes the refrigerant pipe. The condenser 14 can exchange heat with the refrigerant pipe disposed between the air outlet of the compressor 11 and the second throttle 15. To be specific, a cooling medium flowing in the condenser 14 can exchange heat with the refrigerant flowing in the refrigerant pipe. The cooler 32 can exchange heat with the refrigerant pipe disposed between the return air inlet of the compressor 11 and the second throttle 15. To be specific, a cooling medium flowing in the cooler 32 can exchange heat with the refrigerant flowing in the refrigerant pipe.

Similarly, two ends of the cooler 32 communicate with each other through a water pipe. In this case, the second cooling water circuit further includes the water pipe. The motor 21 can exchange heat with the water pipe of the first cooling water circuit, and the power battery 31 can exchange heat with the water pipe of the second cooling water circuit.

Arranged in this way, the passenger compartment thermal management subsystem 10 is integrated with the motor thermal management subsystem 20 by means of the condenser 14, and is integrated with the power battery thermal management subsystem 30 by means of the cooler 32, thereby further improving the degree of integration of the entire thermal management system 100 and reducing waste of heat.

The power battery thermal management subsystem 30 includes a second water pump 33. The second water pump 33 is disposed in the second cooling water circuit, and is configured to provide a second flow force by which a water current flows in the second cooling water circuit. Specifically, the second water pump 33 is mounted on the water pipe included in the second cooling water circuit.

The second water pump 33 is a machine for conveying water or pressurizing water. The second flow force provided by the second water pump 33 can make the water circulate in the second cooling water circuit, thereby helping to dissipate heat of the power battery.

According to some embodiments of this application, the passenger compartment thermal management subsystem 10, the power battery thermal management subsystem 30, and the motor thermal management subsystem 20 are connected through the control valve system. The control valve system enables the cooling water tank 22, the condenser 14, and the cooler 32 to communicate with each other to form a third cooling water circuit, and the third cooling water circuit is configured to cool the motor 21 and the power battery 31. In this way, the passenger compartment thermal management subsystem 10, the motor thermal management subsystem 20, and the power battery thermal management subsystem 30 are integrated together to reduce waste of heat of the thermal management system 100.

It is hereby noted that when the cooling water tank 22, the condenser 14, and the cooler 32 communicate with each other to form a third cooling water circuit, the first cooling water circuit and the second cooling water circuit are cut off. In addition, when the cooling water tank 22, the condenser 14, and the cooler 32 communicate with each other to form the third cooling water circuit, the first refrigerant circuit is controlled to communicate, and the second refrigerant circuit is controlled to become cut-off.

According to some embodiments of this application, the motor thermal management subsystem 20 further includes a first pipe 25, and the power battery thermal management subsystem 30 further includes a second pipe 34. The control valve system enables the first pipe 25 to communicate with the second pipe 34 to form a first heating water circuit. The first heating water circuit is able to transfer heat to and from the motor 21, and absorb the heat of the motor 21 to heat the power battery 31. In this case, the control valve system can turn on communication between the cooler 32 and the cooling water tank 22 to form a fourth cooling water circuit configured to dissipate heat of the cooling water tank 22.

It is hereby noted that the first pipe 25 and the second pipe 34 are both water pipes.

Arranged in this way, the power battery 31 can be heated by the heat generated by the motor 21, thereby reducing the waste of heat. In addition, the cooler 32 dissipates heat for the cooling water tank 22 to further reduce the waste of heat.

According to some embodiments of this application, the condenser 14, the cooling water tank 22, the cooler 32, the first pipe 14, and the second pipe 34 each include two ends connected to each other. It is defined that the two ends of the condenser 14 are a first end and a second end respectively, the two ends of the cooling water tank 22 area third end and a fourth end respectively, the two ends of the cooler 32 are a fifth end and a sixth end respectively, the two ends of the first pipe 25 are a seventh end and an eighth end respectively, and the two ends of the second pipe 34 are a ninth end and a tenth end respectively.

The third end of the cooling water tank 22 communicates with the first end of the condenser 14.

The control valve system includes a first control valve assembly. The first control valve assembly includes five first ports that controllably communicate with each other, and the five first ports communicate with the first end, the second end, the seventh end, the fifth end, and the ninth end respectively. The control valve system further includes a second control valve assembly. The second control valve assembly includes five second ports that controllably communicate with each other, and the five second ports communicate with the third end, the fourth end, the sixth end, the eighth end, and the tenth end respectively.

The condenser 14, the cooling water tank 22, the cooler 32, the first pipe 25, and the second pipe 34 each include two ends. One end of each of such components serves as a water inlet, and the other end serves as a water outlet. Which end serves as a water inlet and which end serves as a water outlet depend on the flow direction of the water circuit.

That the first control valve assembly includes five first ports that controllably communicate with each other means: The first control valve assembly includes five first ports, and any two or more of the five first ports communicate with each other controllably. That the second control valve assembly includes five second ports that controllably communicate with each other means: The second control valve assembly includes five second ports, and any two or more of the five second ports communicate with each other controllably. How the five first ports of the first control valve assembly communicate with each other depends on the working mode. How the five second ports of the second control valve assembly communicate with each other also depends on the working mode.

The control valve system includes the first control valve assembly and the second control valve assembly, the first control valve assembly includes five controllably communicating first ports, and the second control valve assembly includes five controllably communicating second ports, thereby facilitating the formation of the first cooling water circuit, the second cooling water circuit, the third cooling water circuit, the fourth cooling water circuit, and the first heating water circuit.

Still referring to FIG. 1, according to some embodiments of this application, the first control valve assembly includes a first three-way valve 41 and a first four-way valve 42. One of valve ports of the first three-way valve 41 communicates with one of valve ports of the first four-way valve 42. The two first ports connected to the first end and the second end respectively are disposed at the first three-way valve 41. The remaining three first ports are disposed at the first four-way valve 42. The second control valve assembly includes a second three-way valve 51 and a second four-way valve 52.

One of valve ports of the second three-way valve 51 communicates with one of valve ports of the second four-way valve 52. The two second ports connected to the third end and the fourth end respectively are disposed at the second three-way valve 51, and the remaining three second ports are disposed at the second four-way valve 52. In this way, the first cooling water circuit, the second cooling water circuit, the third cooling water circuit, the fourth cooling water circuit, and the first heating water circuit can be formed through two relatively simply structured three-way valves and two relatively simply structured four-way valves.

Still referring to FIG. 2, according to some embodiments of this application, the first control valve assembly includes a first five-way valve 43, and the five first ports are disposed at the first five-way valve 43. The second control valve assembly includes a second five-way valve 53, and the five second ports are disposed at the second five-way valve 53. In this way, the first cooling water circuit, the second cooling water circuit, the third cooling water circuit, the fourth cooling water circuit, and the first heating water circuit can be formed through just a few control valves, thereby simplifying the structure of the thermal management system 100.

Understandably, in other embodiments, the first control valve assembly and the second control valve assembly may be configured in other manners instead, without being limited herein.

According to some embodiments of this application, the passenger compartment thermal management subsystem 10 further includes a heater core 18. The heater core 18 is configured to heat a passenger compartment 200. The control valve system turns on communication between the condenser 14 and the heater core 18 to form a second heating water circuit.

The heater core 18 is configured to transfer heat to the passenger compartment 200, so as to increase the temperature in the passenger compartment 200 and improve the comfort of the passenger compartment 200 in a low-temperature environment.

When the control valve system turns on communication between the condenser 14 and the heater core 18 to form a second heating water circuit, the second heating water circuit can heat the passenger compartment 200, thereby improving comfort of the passenger compartment 200. In addition, because the water circulates in the condenser 14 and the heater core 18, when the heater core 18 heats the passenger compartment 200, the temperature of the water flowing in the heater core decreases, thereby achieving the effect of cooling the condenser 14.

Still referring to FIG. 1 and FIG. 2, according to some embodiments of this application, the passenger compartment thermal management subsystem 10 further includes a heater 17. The heater 17 is disposed in the second heating water circuit and located on a passageway along which a water current flows from the condenser 14 to the heater core 18. To facilitate the mounting of the heater 17, the condenser 14 in the second heating water circuit also communicates with the heater core 18 through a water pipe. In this case, the second heating water circuit includes a water pipe, and the heater 17 is disposed on the water pipe of the second heating water circuit.

The heater 17 is a heating device capable of raising the temperature of the water current that flows through the heating device. For example, the heater 17 is a positive temperature coefficient (PTC) heater 17. The PTC heater 17 is also called a PTC heating element, and is made of a PTC ceramic heating element and an aluminum tube. This type of PTC heating element possesses merits of a small thermal resistance and high heat exchange efficiency, and is a power-saving heater 17 that automatically keeps a constant temperature. Understandably, in other embodiments, the type of the heater 17 is not limited, as long as the heater 17 can raise the temperature of the water current.

The control valve system further includes a third three-way valve 60. The third three-way valve 60 is disposed in the second heating water circuit and located on a passageway along which the water current flows from the condenser 14 to the heater core 18. Three valve ports of the third three-way valve 60 are connected to the condenser 14, the cooling water tank 22, and the heater core 18 respectively. In this way, by controlling the three valve ports of the third three-way valve 60 to open or close, the communication between the condenser 14 and the cooling water tank 22 can be turned on or off, or the communication between the condenser 14 and the heater core 18 can be turned on or off.

Further, when the passenger compartment thermal management subsystem 10 includes the heater 17, the third three-way valve 60 is disposed on a passageway of the water that flows from the condenser 14 to the heater 17, and therefore, the third three-way valve 60 is also mounted on the water pipe between the condenser 14 and the heater 17 in the second heating water circuit.

Understandably, in other embodiments, the control valve system may instead omit the third three-way valve 60. However, in a case that the control valve system omits the third three-way valve 60, when the passenger compartment thermal management subsystem 10 refrigerates the passenger compartment 200, the water in the condenser 14 flows to the heater core 18, thereby preventing the cooling effect of the passenger compartment 200 from being impaired by the heat dissipated by the heater core 18. Generally, a gate that can be opened and closed is disposed between the heater core 18 and the passenger compartment 200. In this case, if the gate is closed, the heat dissipated by the heater core 18 is prevented from flowing to the passenger compartment 200, thereby avoiding impact on the cooling effect of the passenger compartment 200.

Further understandably, the control valve system may give up using the third three-way valve 60 to control the flow of water between the condenser 14 and the cooling water tank 22 and the heater core 18, and may instead employ another valve structure for controlling, without being limited herein.

According to some embodiments of this application, the control valve system causes the second heating water circuit to heat the power battery 31. To be specific, in a low-temperature scenario, the control valve system enables the second heating water circuit to heat the power battery 31, so that the temperature of the power battery 31 is maintained within a temperature range suitable for normal operation, thereby taking full advantage of heat.

According to some embodiments of this application, the control valve system includes a fourth three-way valve 70. The fourth three-way valve 70 is disposed in the second heating water circuit and located on a passageway along which the water current flows from the heater core 18 to the second pipe 34. Three valve ports of the fourth three-way valve 70 are connected to the heater core 18, the condenser 14, and one end of the second pipe 34 respectively, and the other end of the second pipe 34 is connected to the condenser 14. In this way, by controlling the three valve ports of the fourth three-way valve 70 to open or close, the second heating water circuit is made to heat the power battery 31 or not to heat the power battery 31.

Understandably, in other embodiments, the control valve system may instead employ other arrangements to enable the first heating water circuit to heat the power battery 31, without being limited herein.

According to some embodiments of this application, the passenger compartment thermal management subsystem 10 further includes a third water pump 16. The third water pump 16 is disposed in the second heating water circuit, and is configured to provide a third flow force by which a water current flows in the second heating water circuit.

The third water pump 16 is a machine for conveying water or pressurizing water. The third flow force provided by the third water pump 16 can make the water circulate in the second heating water circuit, thereby helping to heat the passenger compartment 200.

According to some embodiments of this application, the passenger compartment thermal management subsystem 10 further includes a dehydrator 19. The dehydrator 19 is disposed in the first refrigerant circuit, located between the compressor 11 and the first throttle 12, and configured to dry the refrigerant. The dehydrator 19 serves to dry the refrigerant, and can filter out tiny impurities in the refrigerant circuit to facilitate the flow of the refrigerant and improve the operating performance of the passenger compartment thermal management subsystem 10.

According to some embodiments of this application, the heat emitting component thermal management subsystem further includes a cooling fan 26, and the cooling fan 26 is disposed beside the cooling water tank 22 and configured to cool the cooling water tank 22. In this way, the cooling fan 26 can facilitate the flow of air and dissipate the heat of the cooling water tank 22 into the air, thereby facilitating heat dissipation of the cooling water tank 22.

According to some embodiments of this application, this application further provides an electric vehicle, including a passenger compartment 200 and the thermal management system 100.

Still referring to FIG. 1, in a first specific embodiment of this application, the thermal management system 100 includes a passenger compartment thermal management subsystem 10 and a heat emitting component thermal management subsystem. The heat emitting component thermal management subsystem includes a motor thermal management subsystem 20 and a power battery thermal management subsystem 30. The thermal management system 100 further includes a control valve system. The control valve system is connected to the passenger compartment thermal management subsystem 10, the motor thermal management subsystem 20, and the power battery thermal management subsystem 30.

The passenger compartment thermal management subsystem 10 includes a compressor 11, a condenser 14, a dehydrator 19, a first throttle 12, an evaporator 13, a second throttle 15, and a cooler 32. The compressor 11, the first throttle 12, and the evaporator 13 can be controlled to communicate with each other to form a first refrigerant circuit. The compressor 11 and the second throttle 15 can be controlled to communicate with each other to form a second refrigerant circuit. The compressor 11 includes an air outlet and a return air inlet. The condenser 14 is located between the air outlet and the dehydrator 19, and exchanges heat with the first refrigerant circuit and the second refrigerant circuit. The cooler 32 is located between the dehydrator 19 and the return air inlet, and exchanges heat with the second refrigerant circuit. The dehydrator 19 is configured to dry the refrigerant.

The passenger compartment thermal management subsystem 10 further includes a heater 17 and a heater core 18. The motor thermal management subsystem 20 includes a motor 21, an electric control device 24, a cooling water tank 22, a cooling fan 26, a first pipe 25, and a bypass pipe 80. The power battery thermal management subsystem 30 includes a power battery 31 and a second pipe 34. The control valve system includes a first three-way valve 41, a second three-way valve 51, a third three-way valve 60, a fourth three-way valve 70, a first four-way valve 42, and a second four-way valve 52.

Three valve ports of the first three-way valve 41 are A1, A2, and A3. Four valve ports of the first four-way valve 42 are B1, B2, B3, and B4. A1 communicates with the first end of the condenser 14, A2 communicates with B1, and A3 communicates with the second end of the condenser 14. B2 communicates with the fifth end of the cooler 32, B3 communicates with the ninth end of the second pipe 34, and B4 communicates with the seventh end of the first pipe 25. A1, A3, B2, B3, and B4 form five first ports of the first control assembly respectively.

Three valve ports of the second three-way valve 51 are C1, C2, and C3. Four valve ports of the second four-way valve 52 are D1, D2, D3, and D4. C2 communicates with the third end of the cooling water tank 22, C1 communicates with the fourth end of the cooling water tank 22, and C3 communicates with D1. D2 communicates with the sixth end of the cooler 32, D3 communicates with the tenth end of the second pipe 34, and D4 communicates with the eighth end of the first pipe 25. C1, C2, D2, D3, and D4 form five second ports of the second control assembly respectively. Specifically, C2 communicates with the third end of the cooling water tank 22 through the bypass pipe 80.

Three valve ports of the third three-way valve 60 are E1, E2, and E3. E1 communicates with the first end of the condenser 14, E2 communicates with the third end of the cooling water tank 22 and A1, and E3 communicates with the heater 17.

Three valve ports of the fourth three-way valve 70 are F1, F2, and F3. F1 communicates with the heater core 18, F2 communicates with the second end of the cooler 32, F3 communicates with the ninth end of the second pipe 34, and the tenth end of the second pipe 34 also communicates with the second end of the condenser 14.

The motor thermal management subsystem 20 further includes a first water pump 23. The power battery thermal management subsystem 30 further includes a second water pump 33. The passenger compartment thermal management subsystem 10 further includes a third water pump 16. The first water pump 23, the second water pump 33, and the third water pump 16 are all configured to provide a flow force by which a water current flows in a water circuit.

The following describes in detail a thermal management system 100 according to a first specific embodiment with reference to specific application scenarios.

It is hereby noted that the dashed line in the drawing represents that a pipe is in a cut-off state, a solid line represents that the pipe is in a communicating state, and an arrow head direction in the drawing represents a flow direction of a refrigerant or water.

Figure 3:
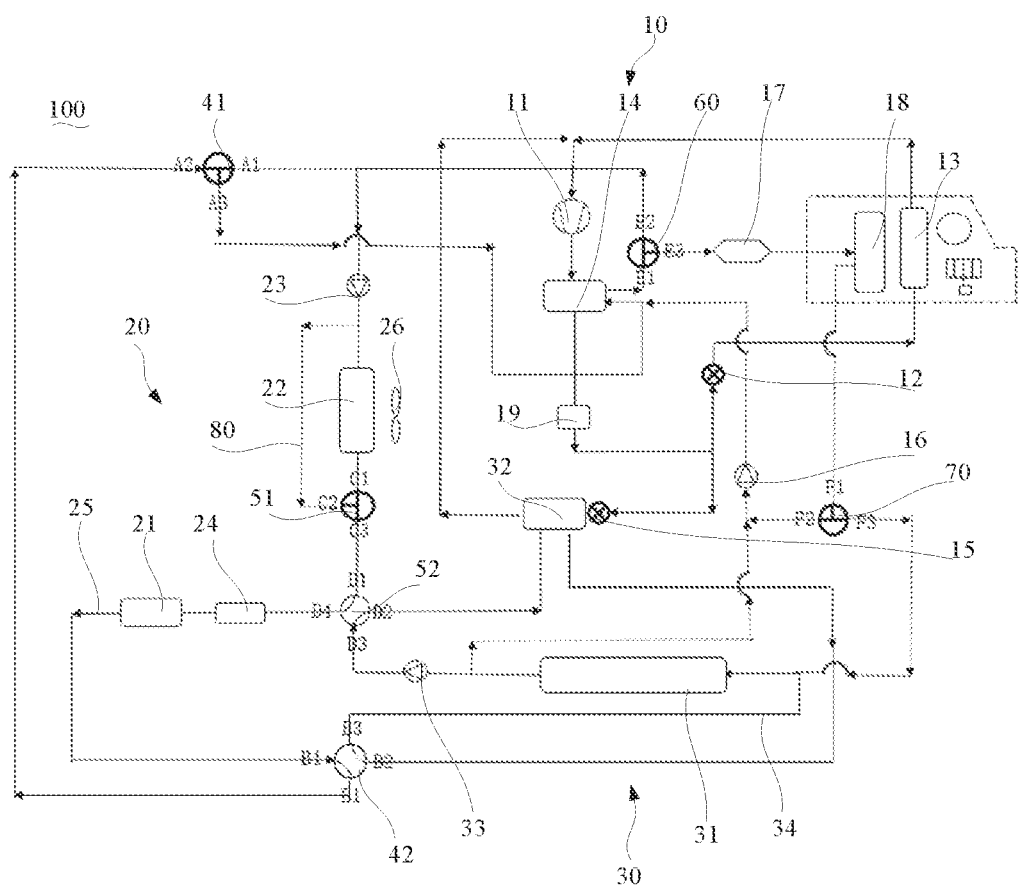
FIG. 3 is a schematic diagram of the thermal management system shown in FIG. 1 and working in a first refrigeration mode.

Scenario 1 (see FIG. 3): In a high-temperature environment, a passenger compartment 200 needs to be refrigerated, and a power battery 31 needs forced cooling. Specifically, when the ambient temperature is higher than a second preset threshold, the thermal management system 100 operates in a first refrigeration mode.

The compressor 11, the first throttle 12, and the evaporator 13 communicate with each other to form a first refrigerant circuit. The compressor 11 and the second throttle 15 communicate with each other to form a second refrigerant circuit.

Of the first three-way valve 41, A2 communicates with A3, and A1 is cut off from A2 and A3. Of the first four-way valve 42, B1 communicates with B4, and B2 communicates with B3. Of the second three-way valve 51, C1 communicates with C3, and C2 is cut off from C1 and C3. Of the second four-way valve 52, D1 communicates with D4, and D2 communicates with D3.

Of the third three-way valve 60, E1 communicates with E2, and E3 is cut off from E1 and E2. In this case, the first cooling water circuit and the second cooling water circuit are formed, and the first water pump 23 and the second water pump 33 work. The third water pump 16 is shut down. Water is unable to flow from the condenser 14 to the power battery 31.

In this way, in the first refrigeration mode, a high-temperature high-pressure refrigerant from an exhaust end of the compressor 11 passes through the condenser 14 to dissipate heat to the first cooling water circuit, and passes through the cooling water tank 22 to dissipate the heat into the air through the cooling fan 26 disposed beside the cooling water tank 22. The heat of a motor 21 and an electric control device 24 can also be dissipated into the air through the cooling water tank 22. An evaporator 13 in the first refrigerant circuit is configured to refrigerate the passenger compartment 200, and the second cooling water circuit is configured to cool the power battery 31.

Figure 4:
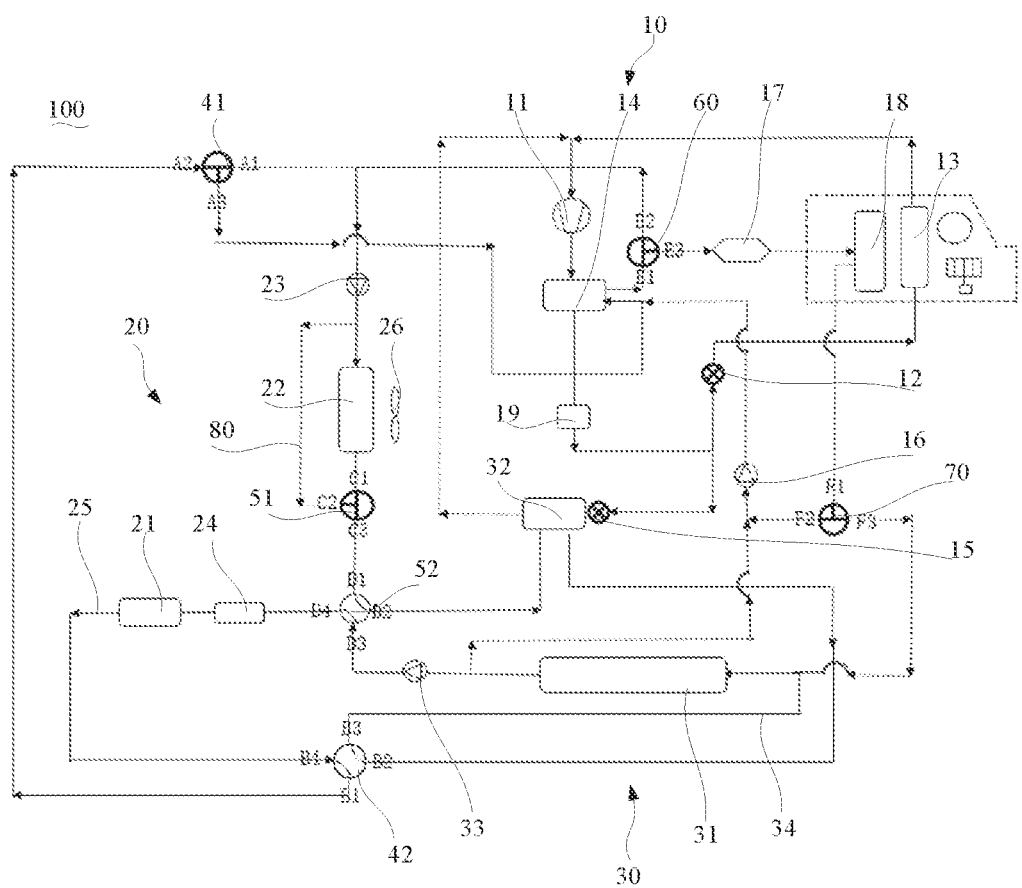
FIG. 4 is a schematic diagram of the thermal management system shown in FIG. 1 and working in a second refrigeration mode.

Scenario 2 (see FIG. 4): In a high-temperature environment, a passenger compartment 200 needs to be refrigerated, and a power battery 31 is cooled passively. Specifically, when the ambient temperature is lower than a first preset threshold, the thermal management system 100 operates in a second refrigeration mode. The first preset threshold is less than the second preset threshold.

The compressor 11, the first throttle 12, and the evaporator 13 communicate with each other to form a first refrigerant circuit.

Of the first three-way valve 41, A2 communicates with A3, and A1 is cut off from A2 and A3. Of the first four-way valve 42, B1 communicates with B4, and B2 communicates with B3. Of the second three-way valve 51, C1 communicates with C3, and C2 is cut off from C1 and C3. Of the second four-way valve 52, D3 communicates with D4, and D2 communicates with D1.

Of the third three-way valve 60, E1 communicates with E2, and E3 is cut off from E1 and E2. In this case, the third cooling water circuit is formed, the first water pump 23 and the second water pump 33 work, and the third water pump 16 is shut down. Water is unable to flow from the condenser 14 to the power battery 31.

In this way, in the second refrigeration mode, a high-temperature high-pressure refrigerant from the exhaust end of the compressor 11 passes through the condenser 14 to dissipate heat to the third cooling water circuit, and passes through the cooling water tank 22 to dissipate the heat into the air through the cooling fan 26 disposed beside the cooling water tank 22. The heat of the motor 21, the electric control device 24, and the power battery 31 can also be dissipated into the air through the cooling water tank 22. The evaporator 13 in the first refrigerant circuit is configured to refrigerate the passenger compartment 200.

Figure 5:
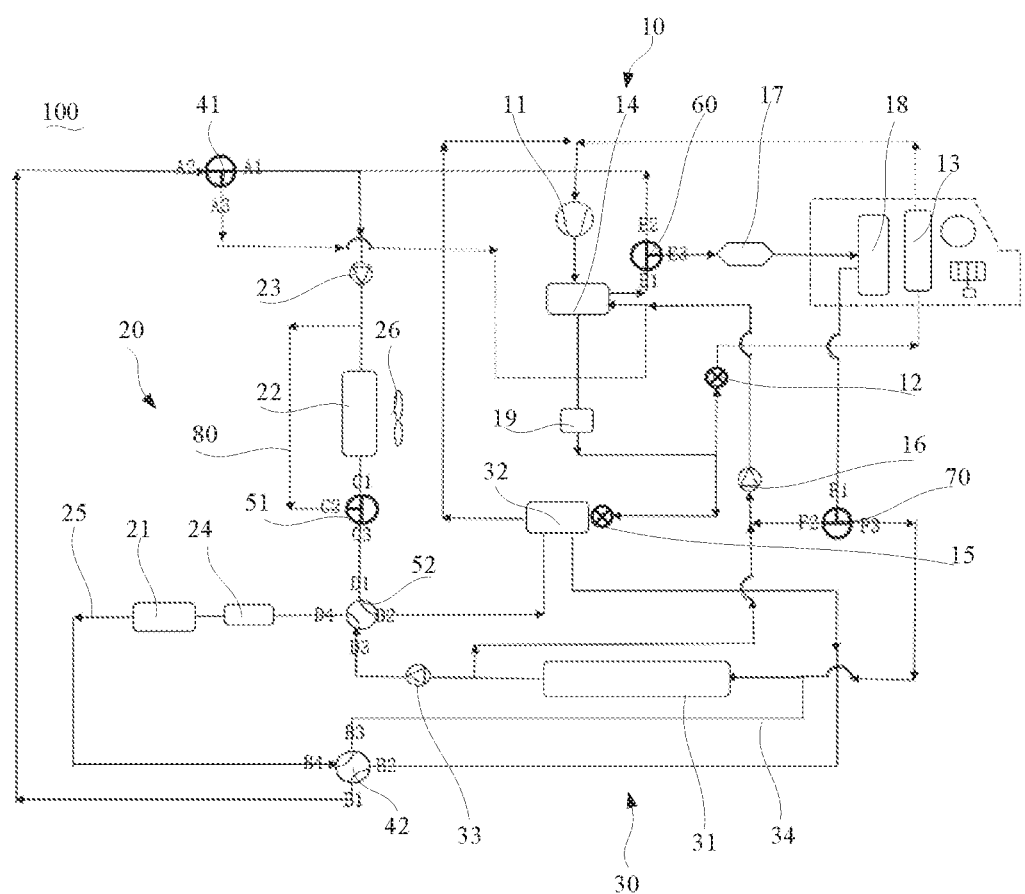
FIG. 5 is a schematic diagram of the thermal management system shown in FIG. 1 and working in a first heating mode.

Scenario 3 (see FIG. 5): In a low-temperature environment, the passenger compartment 200 needs to be heated, and the power battery 31 needs to be heated. In this case, the thermal management system 100 operates in a first heating mode.

The compressor 11 communicates with the second throttle 15 to form a second refrigerant circuit.

Of the first three-way valve 41, A1 communicates with A2, and A3 is cut off from A1 and A2. Of the first four-way valve 42, B1 communicates with B2, and B3 communicates with B4. Of the second three-way valve 51, C1 communicates with C3, and C2 is cut off from C1 and C3. Of the second four-way valve 52, D3 communicates with D4, and D2 communicates with D1.

Of the third three-way valve 60, E1 communicates with E3, and E2 is cut off from E1 and E3. Of the fourth three-way valve 70, F1, F2, and F3 communicate with each other. In this case, a fourth cooling water circuit is formed, and the first water pump 23 and the second water pump 33 work. A second heating water circuit is formed and passes through the power battery 31, and the third water pump 16 works.

In this way, in the first heating mode, a high-temperature high-pressure refrigerant from the exhaust end of the compressor 11 passes through the condenser 14 to dissipate heat to the second heating water circuit, so as to heat the passenger compartment 200 and the power battery 31. In this case, the power battery 31 can also be heated by the heat of the motor 21. In this case, the cooler 32 can absorb heat from the environment through the cooling water tank 22.

It is hereby noted that in this mode, the fourth three-way valve 70 can also be regulated to preclude the second heating water circuit from heating the power battery 31, so that the power battery 31 is heated by just the heat generated by the motor 21 and the electric control device 24.

Figure 6:
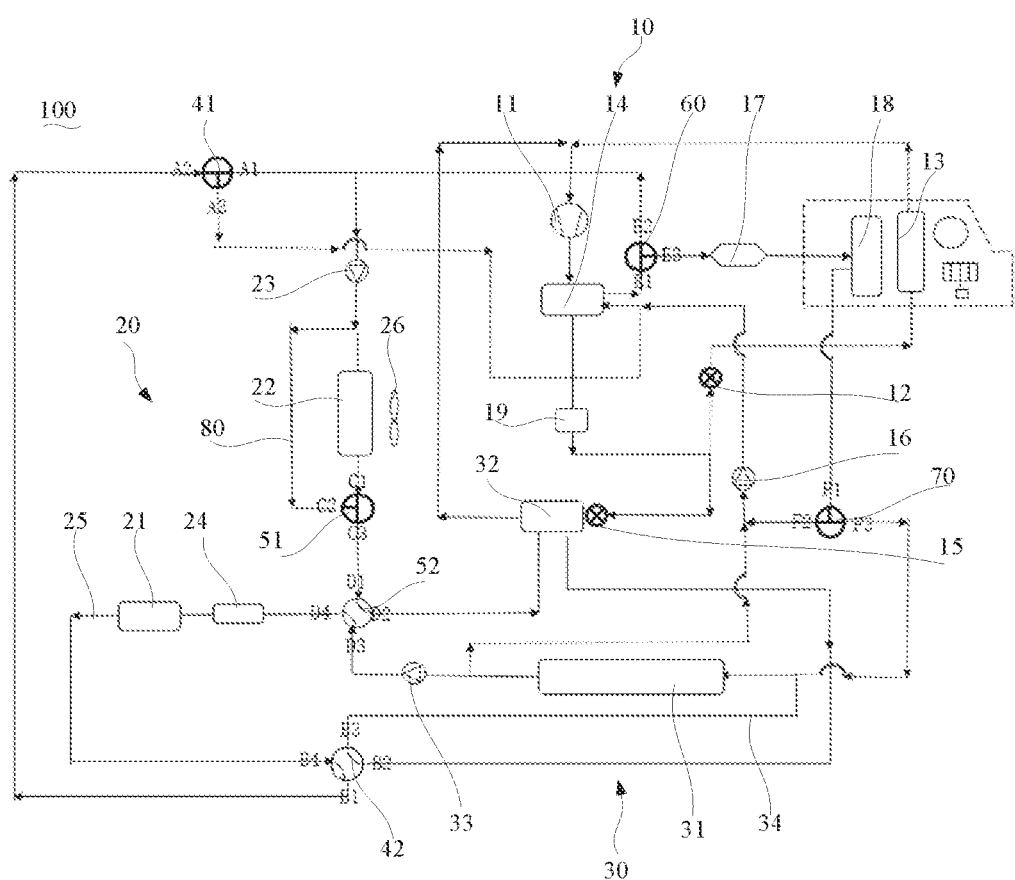
FIG. 6 is a schematic diagram of the thermal management system shown in FIG. 1 and working in a second heating mode.

Scenario 4 (see FIG. 6): In a low-temperature environment, the passenger compartment 200 needs to be heated, and the power battery 31 does not need to be heated. In this case, the thermal management system 100 operates in a second heating mode.

Of the first three-way valve 41, A1 communicates with A2, and A3 is cut off from A1 and A2. Of the first four-way valve 42, B1 communicates with B4, and B2 communicates with B3. Of the second three-way valve 51, C2 communicates with C3, and C1 is cut off from C2 and C3. Of the second four-way valve 52, D3 communicates with D4, and D2 communicates with D1.

Of the third three-way valve 60, E1 communicates with E3, and E2 is cut off from E1 and E3. Of the fourth three-way valve 70, F1 communicates with F2, and F3 is cut off from F1 and F2. In this case, a second cooling water circuit is formed between two ends of the cooler 32, and the first water pump 23 and the second water pump 33 work. A second heating water circuit is formed, and the third water pump 16 works.

In this way, in the second heating mode, a high-temperature high-pressure refrigerant from the exhaust end of the compressor 11 passes through the condenser 14 to dissipate heat to the second heating water circuit, so as to heat the passenger compartment 200. In this case, the cooler 32 recycles the heat of the motor 21, the electric control device 24, and the power battery 31. The cooling water tank 22 is bypassed to prevent the heat from dissipating into the external environment and implement heat recycling.

Figure 7:
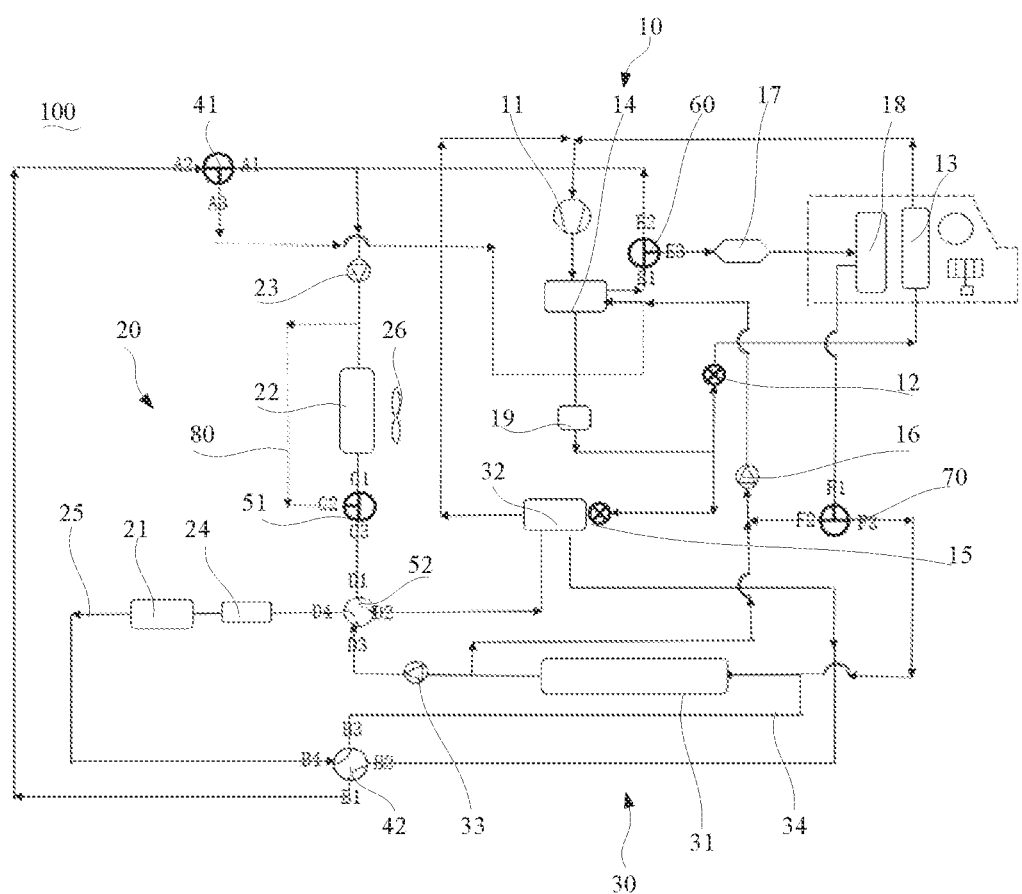
FIG. 7 is a schematic diagram of the thermal management system shown in FIG. 1 and working in a first dehumidification mode.

Scenario 5 (see FIG. 7): In a low-temperature environment, the passenger compartment 200 needs to be heated and dehumidified, and the power battery 31 needs to be heated. In this case, the thermal management system 100 operates in a first dehumidification mode. This mode is applicable when the ambient temperature is relatively low. Generally, this mode is applicable to scenarios in which the ambient temperature is lower than 10° C.

The first dehumidification mode differs from the first heating mode in that, in this mode, the first refrigerant circuit is formed, and the low-temperature refrigerant enters the evaporator 13 to achieve the effects of refrigeration and dehumidification.

Figure 8:
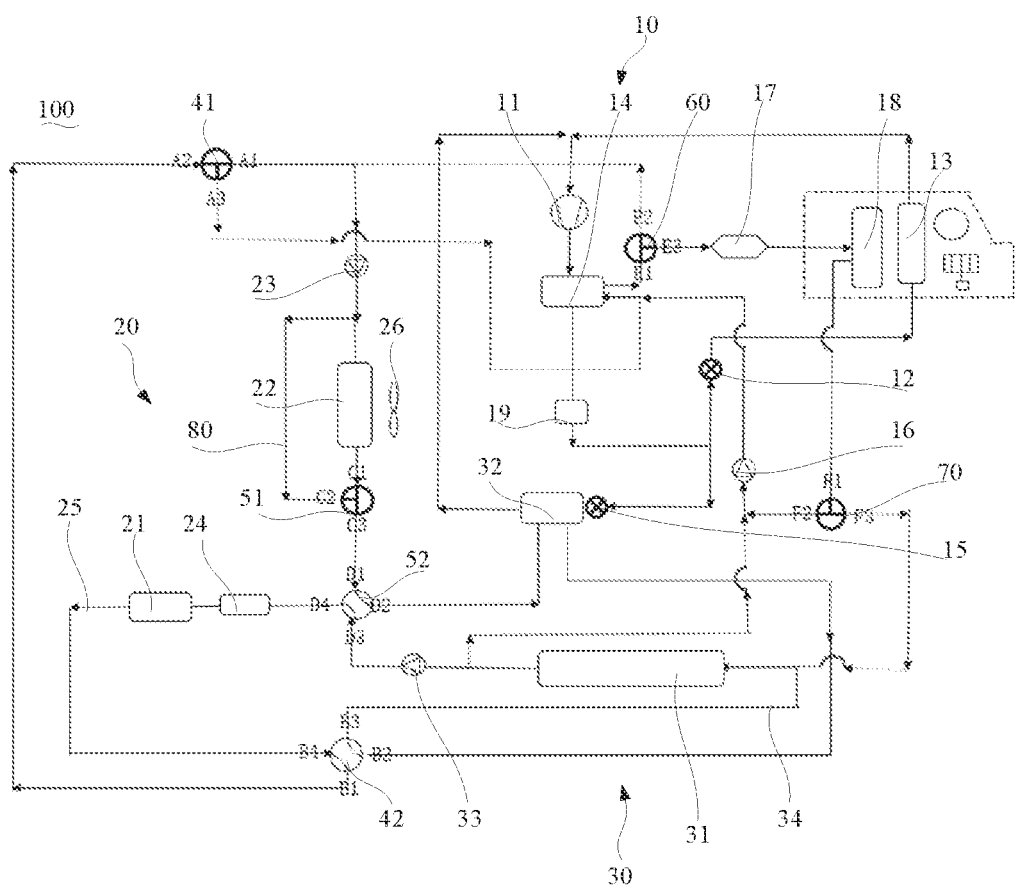
FIG. 8 is a schematic diagram of the thermal management system shown in FIG. 1 and working in a second dehumidification mode.

Scenario 6 (see FIG. 8): In a low-temperature environment, the passenger compartment 200 needs to be heated and dehumidified, and the power battery 31 needs to dissipate heat. In this case, the thermal management system 100 operates in a second dehumidification mode. This mode is applicable when the ambient temperature is relatively low. Generally, this mode is applicable to scenarios in which the ambient temperature is lower than 10° C.

The second dehumidification mode differs from the second heating mode in that, in this mode, the first refrigerant circuit is formed, and the low-temperature refrigerant enters the evaporator 13 to achieve the effects of refrigeration and dehumidification.

Figure 9:
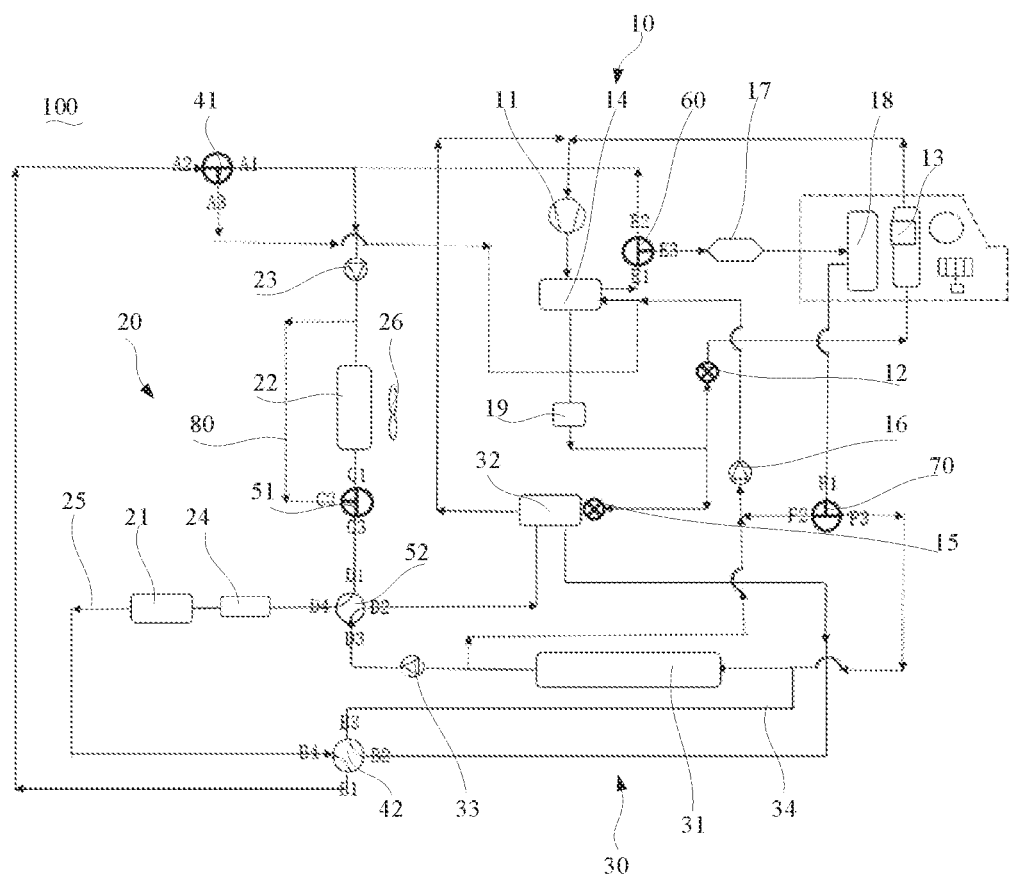
FIG. 9 is a schematic diagram of the thermal management system shown in FIG. 1 and working in a third dehumidification mode.

Scenario 7 (see FIG. 9): In a low-temperature environment, the passenger compartment 200 needs to be heated and dehumidified, and the power battery 31 needs to dissipate heat. In this case, the thermal management system 100 operates in a third dehumidification mode. The ambient temperature to which this mode is applicable is higher than the ambient temperature to which the first dehumidification mode and the second dehumidification mode are applicable. Generally, this mode is applicable to scenarios in which the ambient temperature is higher than 10° C.

This mode differs from the first dehumidification mode in that, in this mode, of the first three-way valve 41, A1 communicates with A2, and A3 is cut off from A1 and A2; and, of the first four-way valve 42, B1 communicates with B4, and B2 communicates with B3. Of the second three-way valve 51, C1 communicates with C3, and C2 is cut off from C1 and C3. Of the first four-way valve 42, D1 communicates with D4, and D2 communicates with D3.

Of the third three-way valve 60, E1 communicates with E3, and E2 is cut off from E1 and E3. Of the fourth four-way valve, F1 communicates with F2, and F3 is cut off from F1 and F2.

In this way, in the third dehumidification mode, the first refrigerant circuit is formed, and the low-temperature refrigerant enters the evaporator 13 to achieve the effects of refrigeration and dehumidification. The second cooling water circuit dissipates heat for the power battery 31, and the cooling water tank 22 dissipates heat for the motor 21 and the electric control device 24.

Figure 10:
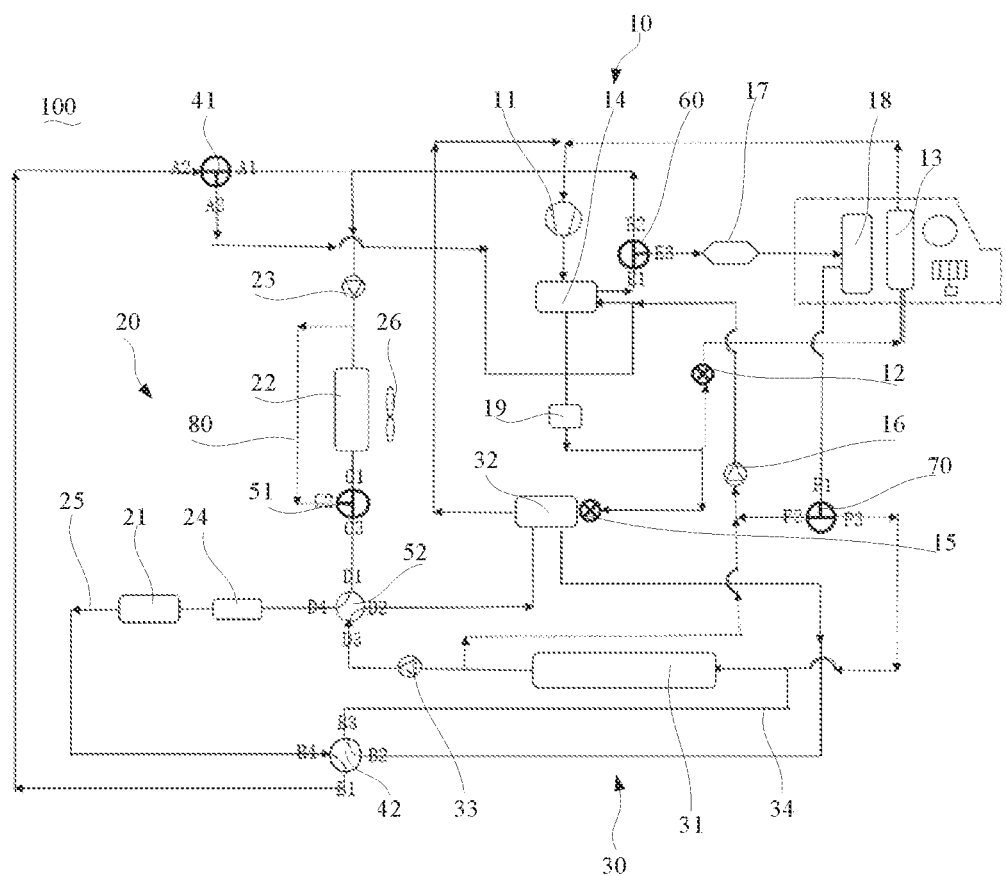
FIG. 10 is a schematic diagram of the thermal management system shown in FIG. 1 and working in a cooling water tank defrost mode.

Scenario 8 (see FIG. 10): In the first heating mode, because the cooling water tank 22 needs to absorb heat from the environment, the surface of the cooling water tank 22 may frost up. This mode is a defrost mode of the cooling water tank 22, and is designed to defrost the cooling water tank 22.

In contrast to the first heating mode, in this mode, A2 of the first three-way valve 41 communicates with A3, and A1 is cut off from A2 and A3. Of the first four-way valve 42, B1 communicates with B4, and B2 communicates with B3. Of the second four-way valve 52, D1 communicates with D4, and D2 communicates with D3.

Of the third three-way valve 60, E1, E2, and E3 communicate with each other. Of the fourth four-way valve, F1 communicates with F2, and F3 is cut off from F1 and F2.

In this way, in the defrost mode of the cooling water tank 22, the water flowing out of the condenser 14 passes through the third three-way valve 60. A part of the water flows through the first water pump 23 and flows to the cooling water tank 22 for defrosting, and the other part flows through the heater 17 and flows to the heater core 18 to heat the passenger compartment 200. Meanwhile, the second cooling water circuit cools down the power battery 31, and the first cooling water circuit cools down the motor 21 and the electric control device 24.

It is hereby noted that the eight operating modes are main operating modes of the thermal management system 100 according to the first specific embodiment. The thermal management system 100 can implement more operating modes by regulating the control valve system.

Still referring to FIG. 2, a second specific embodiment of this application differs from the first specific embodiment in:

The first three-way valve 41 and the first four-way valve 42 of the control valve system are replaced by the first five-way valve 43, and the second three-way valve 51 and the second four-way valve 52 are replaced by the second five-way valve 53. Five valve ports of the first five-way valve 43 are G1, G2, G3, G4, and G5, and are the five first ports of the first control valve assembly. Five valve ports of the second five-way valve 53 are H1, H2, H3, H4, and H5, and are the five second ports of the second control valve assembly.

G2 communicates with the first end of the cooler 32. G1 communicates with the second end of the condenser 14. G3 communicates with the seventh end of the first pipe 25. G4 communicates with the fifth end of the cooler 32. G5 communicates with the ninth end of the second pipe 34. H1 communicates with the fourth end of the cooling water tank 22. H2 communicates with the third end of the cooling water tank 22. H3 communicates with the eighth end of the first pipe 25. H4 communicates with the sixth end of the cooler 32. H5 communicates with the tenth end of the second pipe 34.

The second specific embodiment is applicable to the same application scenarios as the first specific embodiment, both including eight main application scenarios, and differs in the communication between the valve ports of the first five-way valve 43 and the valve ports of the second five-way valve 53. The following describes only the differences, and omits the same communication relationships.

Figure 11:
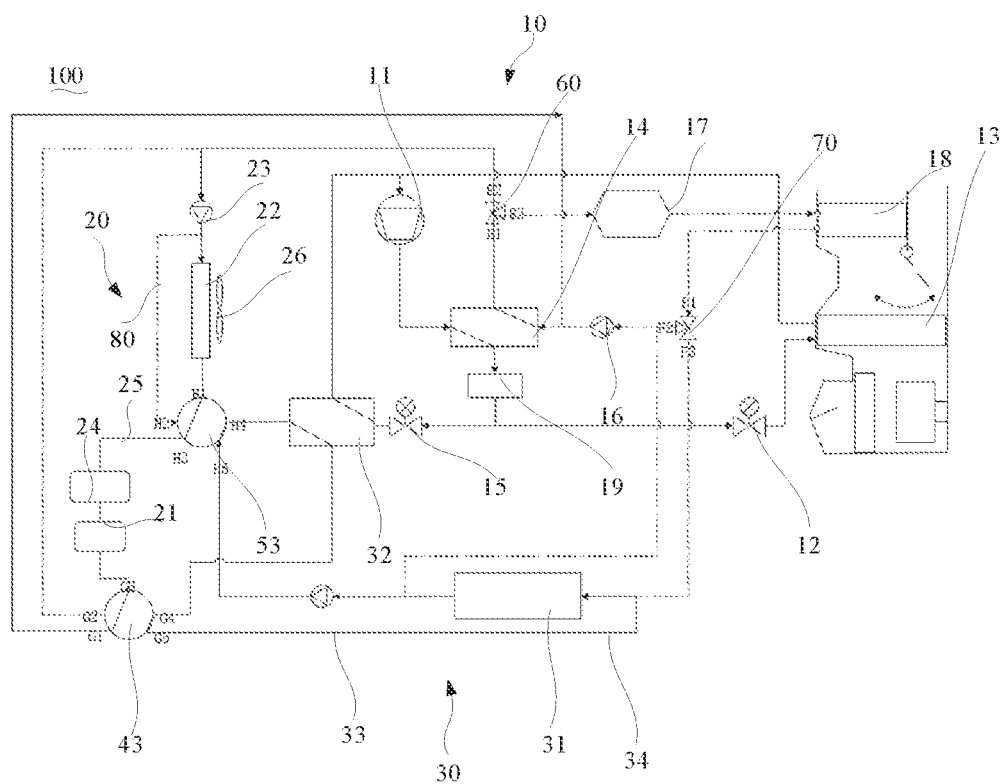
FIG. 11 is a schematic diagram of the thermal management system shown in FIG. 2 and working in a first refrigeration mode.

Scenario 1 (See FIG. 11):

In the first refrigeration mode, the differences from the first specific embodiment are: of the first five-way valve 43, G1 communicates with G3, G4 communicates with G5, and G2 is cut off from G1, G3, G4, and G5; and of the second five-way valve 53, H1 communicates with H3, H4 communicates with H5, and H2 is cut off from H1, H3, H4, and H5.

Figure 12:
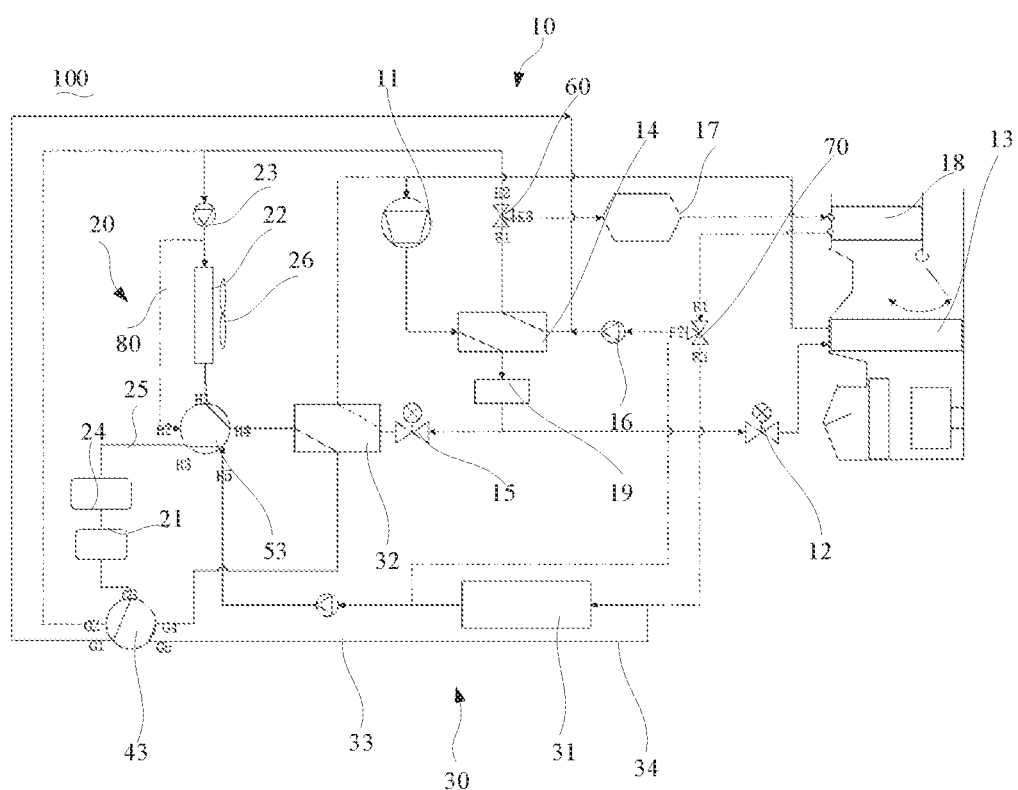
FIG. 12 is a schematic diagram of the thermal management system shown in FIG. 2 and working in a second refngeration mode.

Scenario 2 (See FIG. 12):

in the second refrigeration mode, of the first five-way valve 43, G1 communicates with G3, G4 communicates with G5, and G2 is cut off from G1, G3, G4, and G5; and of the second five-way valve 53, H1 communicates with H4, H3 communicates with H5, and H2 is cut off from H1, H3, H4, and H5.

Figure 13:
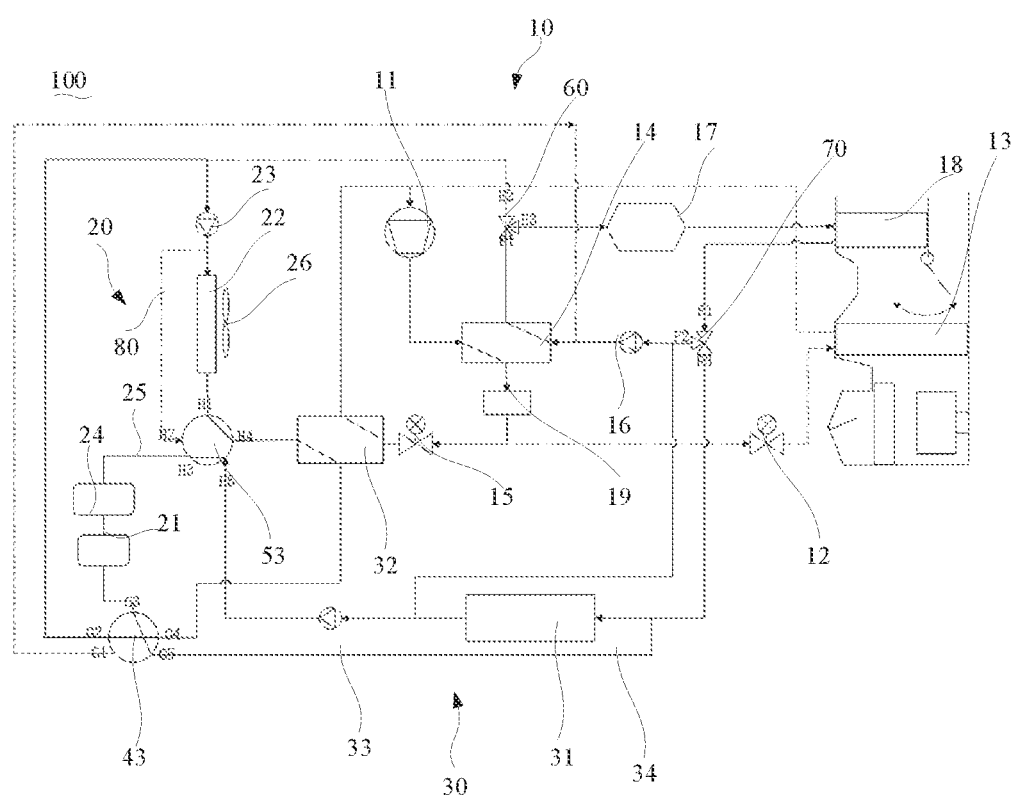
FIG. 13 is a schematic diagram of the thermal management system shown in FIG. 2 and working in a first heating mode.

Scenario 3 (See FIG. 13):

In the first heating mode, of the first five-way valve 43, G2 communicates with G4, G3 communicates with G5, and G1 is cut off from G2, G3, G4, and G5; and of the second five-way valve 53, H1 communicates with H4, H3 communicates with H5, and H2 is cut off from H1, H3, H4, and H5.

Figure 14:
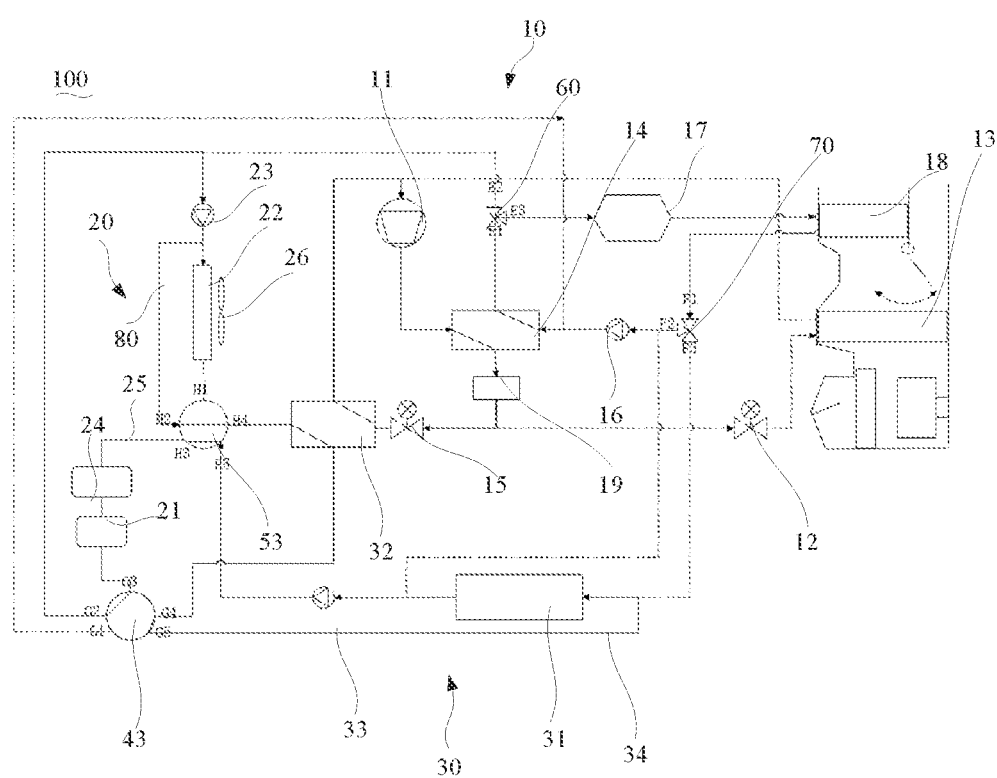
FIG. 14 is a schematic diagram of the thermal management system shown in FIG. 2 and working in a second heating mode.

Scenario 4 (See FIG. 14):

In the second heating mode, of the first five-way valve 43, G2 communicates with G3, G4 communicates with G5, and G1 is cut off from G2, G3, G4, and G5; and of the second five-way valve 53, H2 communicates with H4, H3 communicates with H5, and H1 is cut off from H2, H3. H4, and H5.

Figure 15:
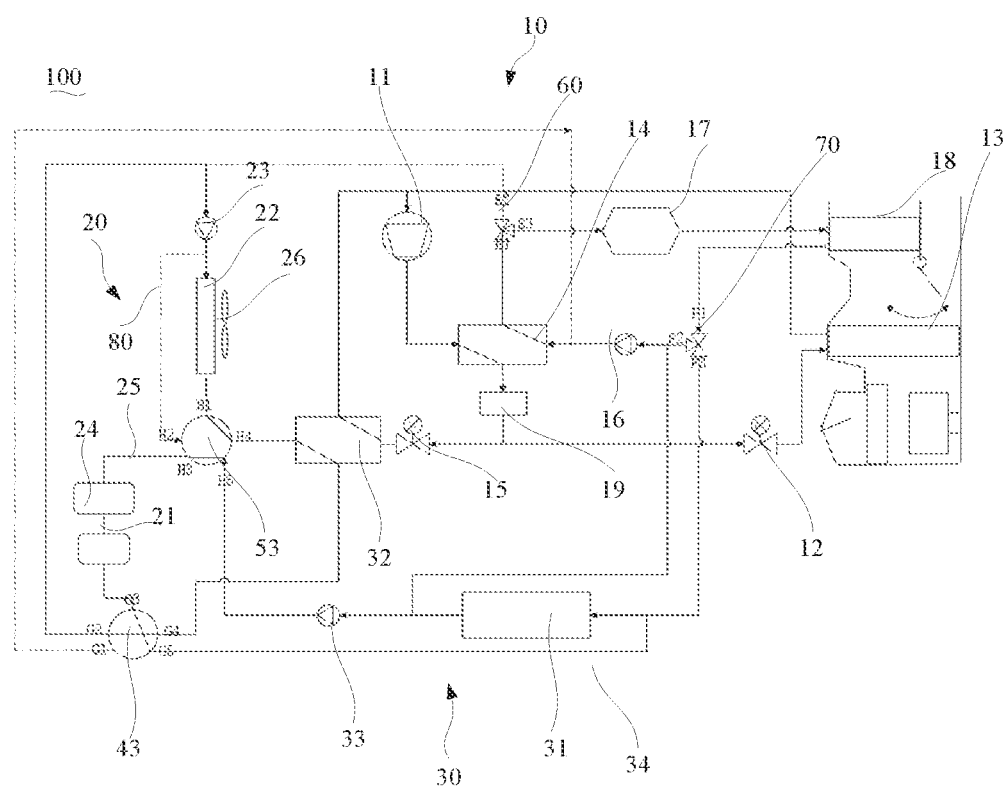
FIG. 15 is a schematic diagram of the thermal management system shown in FIG. 2 and working in a first dehumidification mode.

Scenario 5 (See FIG. 15):

The first dehumidification mode in the second specific embodiment differs from the first heating mode in that, in this mode, the first refrigerant circuit is formed, and the low-temperature refrigerant enters the evaporator 13 to achieve the effects of refrigeration and dehumidification.

Figure 16:
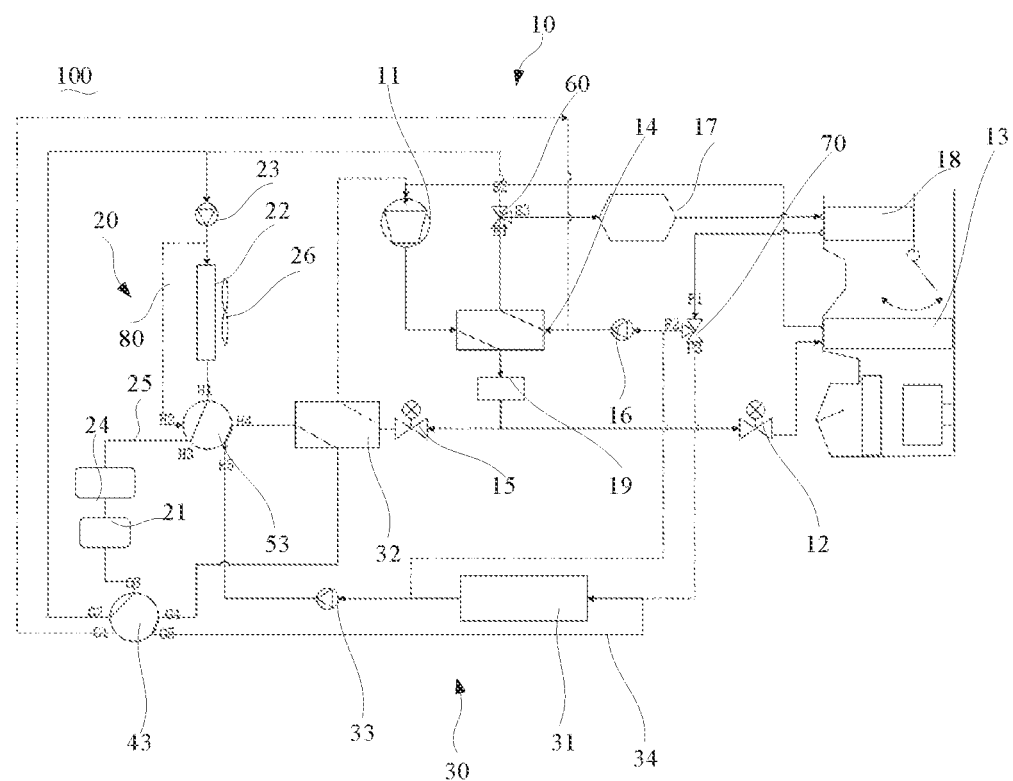
FIG. 16 is a schematic diagram of the thermal management system shown in FIG. 2 and working in a second dehumidification mode.

Scenario 6 (See FIG. 16):

The second dehumidification mode in the second specific embodiment differs from the second heating mode in that, in this mode, the first refrigerant circuit is formed, and the low-temperature refrigerant enters the evaporator 13 to achieve the effects of refrigeration and dehumidification.

Figure 17:
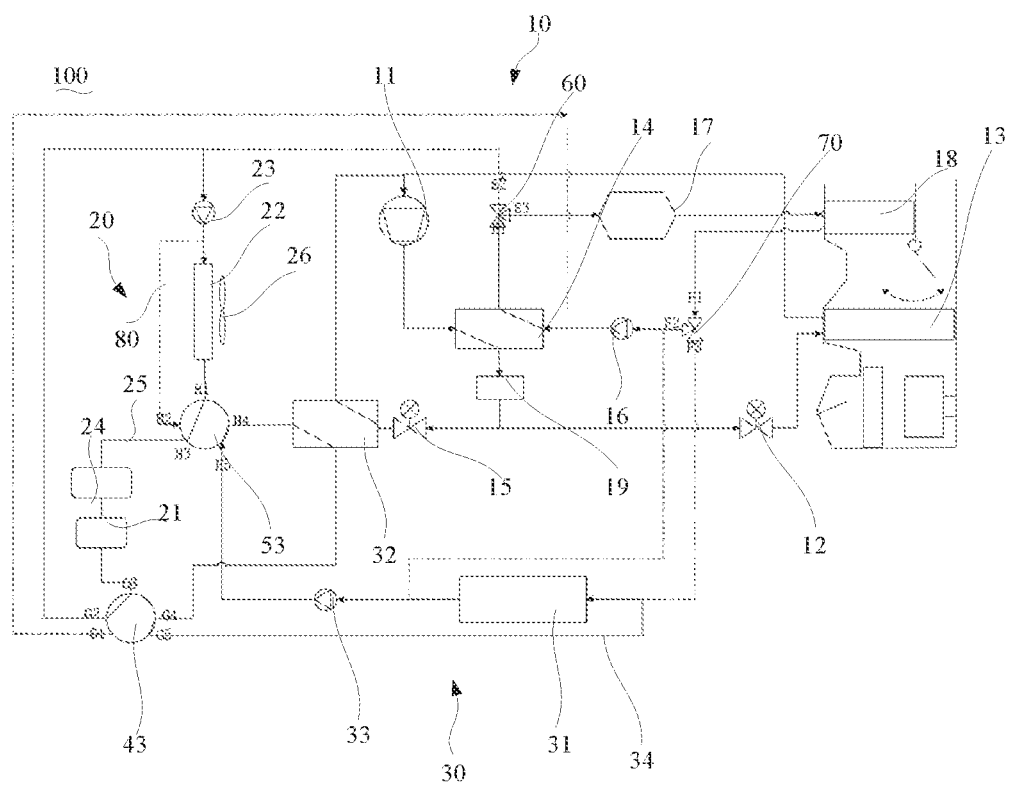
FIG. 17 is a schematic diagram of the thermal management system shown in FIG. 2 and working in a third dehumidification mode.

Scenario 7 (See FIG. 17):

The third dehumidification mode differs from the first dehumidification mode in the following aspects:

In the second heating mode, of the first five-way valve 43, G2 communicates with G3, G4 communicates with G5, and G1 is cut off from G2, G3, G4, and G5; and of the second five-way valve 53, H1 communicates with H3, H4 communicates with H5, and H2 is cut off from H1, H3, H4, and H5.

Figure 18:
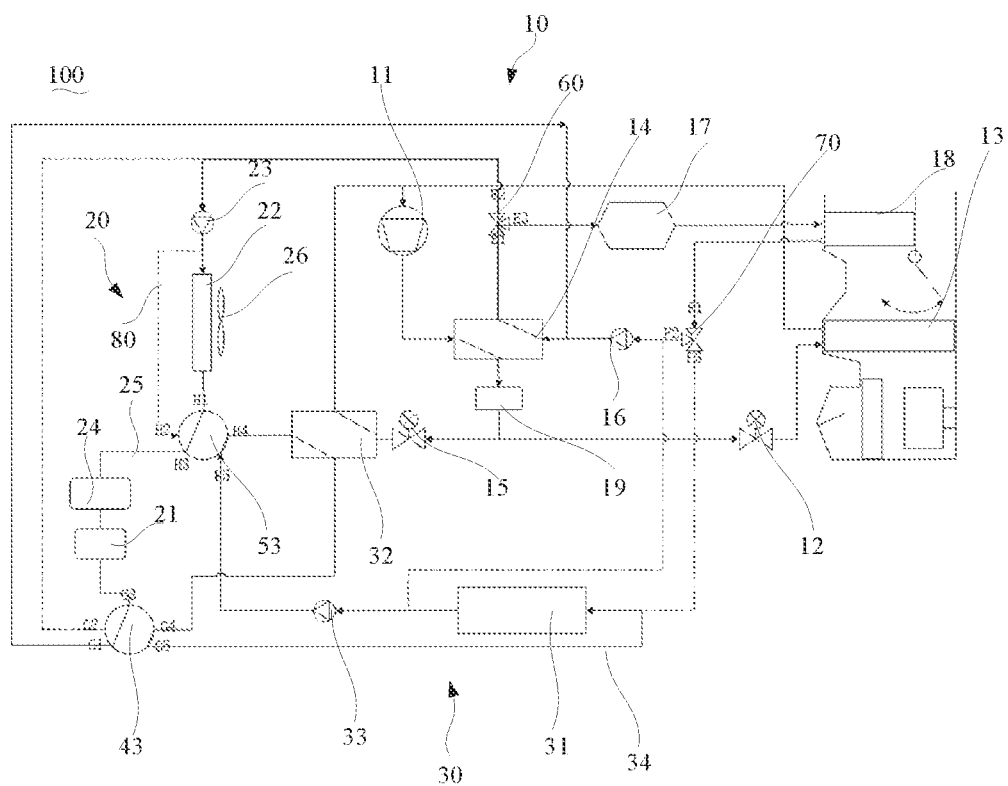
FIG. 18 is a schematic diagram of the thermal management system shown in FIG. 2 and working in a cooling water tank defrost mode.

Scenario 8 (See FIG. 18):

A defrost mode of the cooling water tank 22 is applied, and differs from the first heating mode in the following aspects:

of the first five-way valve 43, G1 communicates with G3, G4 communicates with G5, and G2 is cut off from G1, G3, G4, and G5; and of the second five-way valve 53, H1 communicates with H3, H4 communicates with H5, and H2 is cut off from H1, H3, H4, and H5.

It is hereby noted that, in the eight main operating modes, the second specific embodiment differs from the first specific embodiment in the control of the valve ports. In each corresponding mode, the two specific embodiments implement the same functions.

Figure 19:
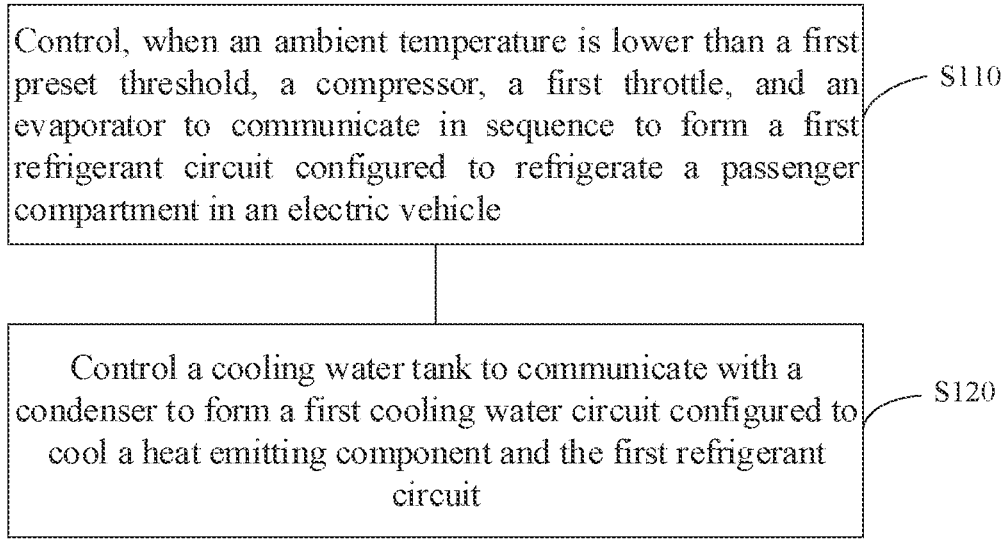
FIG. 19 is a flowchart of a method for controlling a thermal management system according to an embodiment of this application.

Referring to FIG. 19, this application further provides a method for controlling a thermal management system 100, including steps of:

S110: controlling, when an ambient temperature is lower than a first preset threshold, a compressor 11, a first throttle 12, and an evaporator 13 to communicate in sequence to form a first refrigerant circuit configured to refrigerate a passenger compartment 200 in an electric vehicle, and S120: controlling a cooling water tank 22 to communicate with a condenser 14 to form a first cooling water circuit configured to cool a heat emitting component and the first refrigerant circuit.

The cooling water tank 22 is configured to cool the heat emitting component, and the condenser 14 is disposed between the compressor 11 and the first throttle 12, and is able to exchange heat with the first refrigerant circuit.

The compressor 11, the first throttle 12, the evaporator 13, the cooling water tank 22, and the heat emitting component have been described above, and are not repeated here.

The first preset threshold may be set as required. When the ambient temperature is relatively high and lower than the first preset threshold, the compressor 11, the first throttle 12, and the evaporator 13 are controlled to communicate in sequence to form a first refrigerant circuit to refrigerate the passenger compartment 200. In addition, the cooling water tank 22 and the condenser 14 are controlled to communicate with each other to form a first cooling water circuit. The first cooling water circuit can cool the condenser 14 and the heat emitting component.

In the method for controlling a thermal management system 100, the first cooling water circuit can cool the heat emitting component. In addition, because water circulates in the first cooling water circuit, lower-temperature water is substituted cyclically in the condenser 14, so as to facilitate heat absorbing during heat exchange between the condenser 14 and the first refrigerant circuit. To be specific, the cooling water tank 22 not only serves as a radiator for the heat emitting component, but also serves as a radiator for the condenser 14, thereby avoiding the need of an additional radiator to cool the condenser 14, improving the degree of integration of the entire thermal management system 100, and reducing waste of heat. Moreover, because the condenser 14 is refrigerated by water cooling, the refrigerant circuit is simplified compared to the arrangement in which the condenser 14 is used as a part of the first refrigerant circuit in the prior art, thereby reducing the injection amount of the refrigerant and achieving the effect of energy saving.

According to some embodiments of this application, the heat emitting component thermal management subsystem includes a motor thermal management subsystem 20 and a power battery thermal management subsystem 30, and the heat emitting component includes the motor 21 and the power battery 31. The first cooling water circuit can selectively cool the motor 21 and/or the power battery 31. The first cooling water circuit serves to cool the motor 21 and/or the power battery 31, so that the temperature of the motor 21 and/or the power battery 31 can be lowered, thereby ensuring that the motor 21 and/or the power battery 31 operates within a temperature range suitable for normal operation.

According to some embodiments of this application, the method for controlling a thermal management system 100 further includes steps of:

controlling, when the ambient temperature is higher than a second preset threshold, the compressor 11 and a second throttle 15 to communicate with each other to form a second refrigerant circuit; and controlling formation of a second cooling water circuit between two ends of a cooler 32 to cool a power battery 31, where the first cooling water circuit is configured to cool a motor 21.

In the steps above, the second preset threshold is greater than the first preset threshold; the compressor 11 includes an air outlet and a return air inlet connected to each other, the condenser 14 is disposed between the air outlet and the second throttle 15 and able to exchange heat with the second refrigerant circuit, and the cooler 32 is disposed between the return air inlet and the second throttle 15 and able to exchange heat with the second refrigerant circuit.

The second throttle 15 and the cooler 32 have been described above, and are not repeated here.

The second preset threshold may be set as required. When the ambient temperature is relatively high and higher than the second preset threshold, the first refrigerant circuit refrigerates the passenger compartment 200, the motor 21 dissipates heat through the first cooling water circuit, and the power battery 31 dissipates heat through the second cooling water circuit.

Arranged in this way, the thermal management system 100 is more integrated, so that the degree of integration of the entire thermal management system 100 is further improved, and the waste of heat is reduced.

In another embodiment, when the ambient temperature is higher than a second preset threshold, the compressor 11 and a second throttle 15 are controlled to communicate with each other to form a second refrigerant circuit.

The cooler 32, the condenser 14, and the cooling water tank 22 are controlled to communicate with each other to form a third cooling water circuit to cool the motor 21 and the power battery 31.

Arranged in this way, the thermal management system 100 is even more integrated, so that the degree of integration of the entire thermal management system 100 is further improved, and the waste of heat is reduced.

According to some embodiments of this application, the method for controlling a thermal management system 100 further includes steps of:

controlling, when the ambient temperature is lower than a third preset threshold, the first refrigerant circuit to become cut-off, and controlling the condenser 14 and a heater core 18 to communicate to form a second heating water circuit, where the heater core 18 is configured to heat the passenger compartment 200; and controlling formation of a second cooling water circuit between two ends of a cooler 32 to cool a power battery 31, where the cooling water tank 22 is configured to cool a motor 21.

In the steps above, the third preset threshold is less than the first preset threshold.

The heater core 18 has been described above, and is not repeated here.

The third preset threshold may be set as required. When the ambient temperature is relatively low and lower than the third preset threshold, the second heating water circuit heats the passenger compartment 200. In addition, because the water circulates in the condenser 14 and the heater core 18, when the heater core 18 heats the passenger compartment 200, the temperature of the water flowing in the heater core decreases, thereby achieving the effect of cooling the condenser 14.

In another embodiment, when the ambient temperature is lower than a third preset threshold, the first refrigerant circuit is controlled to become cut-off, and the condenser 14 and a heater core 18 are controlled to communicate with each other to form a second heating water circuit. The heater core 18 is configured to heat the passenger compartment 200.

The second cooling water circuit is controlled to be formed between two ends of the cooler 32 to cool the power battery 31 and the motor 21.

Arranged in this way, the passenger compartment thermal management subsystem 10 is integrated with the motor thermal management subsystem 20 by means of the condenser 14, and is integrated with the power battery thermal management subsystem 30 by means of the cooler 32, thereby further improving the degree of integration of the entire thermal management system 100 and reducing waste of heat.

According to some embodiments of this application, the thermal management system 100 includes a first pipe 25 and a second pipe 34, and the second heating water circuit is configured to heat the power battery 31.

The first pipe 25 and the second pipe 34 are controlled to communicate with each other to form a first heating water circuit. The cooling water tank 22 communicates with the cooler 32 to form a water circuit.

Arranged in this way, the power battery 31 can be heated by the heat generated by the motor 21, thereby reducing the waste of heat. In addition, the cooler 32 dissipates heat for the cooling water tank 22 to further reduce the waste of heat.

According to some embodiments of this application, the first refrigerant circuit is controlled to communicate, and the evaporator 13 is configured to defrost the passenger compartment 200.

In this way, when the second refrigerant circuit heats the passenger compartment 200, the first refrigerant circuit is available for dehumidifying the passenger compartment 200, so as to improve the comfort of the passenger compartment 200.

According to some embodiments of this application, a second cooling water circuit is controlled to be formed between two ends of a cooler 32 to cool a power battery 31, where the first cooling water circuit is configured to cool a motor 21.

Alternatively, the cooler 32, the condenser 14, and the cooling water tank 22 are controlled to communicate with each other to form a third cooling water circuit to cool the motor 21 and the power battery 31.

The condenser 14 is configured to defrost the cooling water tank 22.

During heating of the passenger compartment 200, when the cooler 32 absorbs heat from the environment through the cooling water tank 22, the surface of the cooling water tank 22 is prone to frost up. Arranged in this way, hot water in the condenser 14 can be passed into the cooling water tank 22 to defrost the cooling water tank 22.

Finally, it needs to be noted that the foregoing embodiments are merely intended to describe the technical solutions of this application but not to limit this application. Although this application is described in detail with reference to the foregoing embodiments, a person of ordinary skill in the art understands that modifications may still be made to the technical solutions described in the foregoing embodiments, or equivalent replacements may still be made to some or all technical features thereof. The modifications and equivalent replacements, which do not make the essence of the corresponding technical solutions depart from the scope of the technical solutions of the embodiments of this application, fall within the scope of the claims and specification hereof. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. A thermal management system, applied to an electric vehicle, wherein the electric vehicle comprises a passenger compartment, and the thermal management system comprises:
   a passenger compartment thermal management subsystem, comprising:
      a compressor comprising an outlet and a return inlet, a first throttle, an evaporator, a second throttle, a cooler, and a condenser,
      wherein the compressor, the first throttle, and the evaporator are controlled to communicate with each other in sequence to form a first refrigerant circuit configured to refrigerate the passenger compartment;
      wherein the compressor and the second throttle are controlled to communicate with each other to form a second refrigerant circuit;
      wherein the condenser is disposed between the compressor and the first throttle and disposed between the compressor and the second throttle, and the condenser is able to exchange heat with the first refrigerant circuit and the second refrigerant circuit;
      wherein the cooler is disposed between the return inlet and the second throttle and able to exchange heat with the second refrigerant circuit;
   a heat emitting component thermal management subsystem, comprising a motor thermal management subsystem, a power battery thermal management subsystem, and a cooling water tank, the motor thermal management subsystem comprising a motor, and the power battery thermal management subsystem comprises a power battery; and
   a control valve system, connected to the passenger compartment thermal management subsystem and the heat emitting component thermal management subsystem, wherein the control valve system is able to control the cooling water tank and the condenser to communicate with each other to form a first cooling water circuit and control the two ends of the cooler to communicate with each other to form a second cooling water circuit, the first cooling water circuit is configured to cool the motor, and the second cooling water circuit is configured to cool the power battery.

2. The thermal management system according to claim 1, wherein the motor thermal management subsystem further comprises a first water pump, and the first water pump is disposed in the first cooling water circuit, and is configured to provide a first flow force by which a water current flows in the first cooling water circuit.

3. The thermal management system according to claim 1, wherein the heat emitting component thermal management subsystem further comprises an electric control device configured to control the motor, and the control valve system enables the first cooling water circuit to cool the electric control device.

4. The thermal management system according to claim 1, wherein the power battery thermal management subsystem further comprises a second water pump, and the second water pump is disposed in the second cooling water circuit, and is configured to provide a second flow force by which a water current flows in the second cooling water circuit.

5. The thermal management system according to claim 1, wherein the passenger compartment thermal management subsystem, the power battery thermal management subsystem, and the motor thermal management subsystem are connected through the control valve system; and
   the control valve system enables the cooling water tank, the condenser, and the cooler to communicate with each other to form a third cooling water circuit, and the third cooling water circuit is configured to cool the motor and the power battery.

6. The thermal management system according to claim 1, wherein the motor thermal management subsystem further comprises a first pipe, and the power battery thermal management subsystem further comprises a second pipe; and
   the control valve system enables the first pipe to communicate with the second pipe to form a first heating water circuit, and the first heating water circuit is able to transfer heat to and from the motor, heat the battery by using absorbed heat of the motor, and turn on communication between the cooler and the cooling water tank to form a fourth cooling water circuit configured to cool the cooling water tank.

7. The thermal management system according to claim 6, wherein the condenser comprises a first end and a second end that are connected to each other, the cooling water tank comprises a third end and a fourth end that are connected to each other, and the third end communicates with the first end; the cooler comprises a fifth end and a sixth end that are connected to each other, the first pipe comprises a seventh end and an eighth end that are connected to each other, and the second pipe comprises a ninth end and a tenth end that are connected to each other; and the control valve system comprises a first control valve assembly and a second control valve assembly, the first control valve assembly comprises five first ports that controllably communicate with each other, and the five first ports are connected to the first end, the second end, the seventh end, the fifth end, and the ninth end respectively; and the second control valve assembly comprises five second ports that controllably communicate with each other, and the five second ports communicate with the third end, the fourth end, the sixth end, the eighth end, and the tenth end respectively.

8. The thermal management system according to claim 7, wherein the first control valve assembly comprises a first three-way valve and a first four-way valve, one of valve ports of the first three-way valve communicates with one of valve ports of the first four-way valve, the two first ports connected to the first end and the second end respectively are disposed at the first three-way valve, and the remaining three first ports are disposed at the first four-way valve; or the first control valve assembly comprises a first five-way valve, and the five first ports are disposed at the first five-way valve.

9. The thermal management system according to claim 7, wherein the second control valve assembly comprises a second three-way valve and a second four-way valve, one of valve ports of the second three-way valve communicates with one of valve ports of the second four-way valve, the two second ports connected to the third end and the fourth end respectively are disposed at the second three-way valve, and the remaining three second ports are disposed at the second four-way valve; or the second control valve assembly comprises a second five-way valve, and the five second ports are disposed at the second five-way valve.

10. The thermal management system according to claim 1, wherein the passenger compartment thermal management subsystem further comprises a heater core configured to heat the passenger compartment, and the control valve system turns on communication between the condenser and the heater core to form a second heating water circuit.

11. The thermal management system according to claim 10, wherein the passenger compartment thermal management subsystem further comprises a heater, the heater is disposed in the second heating water circuit and located on a passageway along which a water current flows from the condenser to the heater core.

12. The thermal management system according to claim 10, wherein the control valve system comprises a third three-way valve, the third three-way valve is disposed in the second heating water circuit and located on a passageway along which a water current flows from the condenser to the heater core; and three valve ports of the third three-way valve are connected to the condenser, the cooling water tank, and the heater core respectively.

13. The thermal management system according to claim 10, wherein the control valve system causes the second heating water circuit to heat the power battery.

14. The thermal management system according to claim 13, wherein the power battery thermal management subsystem comprises a second pipe, and the second pipe is able to exchange heat with the power battery; the control valve system comprises a fourth three-way valve, the fourth three-way valve is disposed in the second heating water circuit, and located on a passageway along which a water current flows from the heater core to the second pipe; and three valve ports of the fourth three-way valve are connected to the heater core, the condenser, and one end of the second pipe respectively, and the other end of the second pipe is connected to the condenser.

15. The thermal management system according to claim 10, wherein the passenger compartment thermal management subsystem further comprises a third water pump, and the third water pump is disposed in the second heating water circuit, and is configured to provide a third flow force by which a water current flows in the second heating water circuit.

16. The thermal management system according to claim 1, wherein the passenger compartment thermal management subsystem further comprises a dehydrator, and the dehydrator is disposed in the first refrigerant circuit, located between the compressor and the first throttle, and configured to dry the refrigerant.

17. The thermal management system according to claim 1, wherein the heat emitting component thermal management subsystem further comprises a cooling fan, and the cooling fan is disposed beside the cooling water tank and configured to cool the cooling water tank.

18. A method for controlling a thermal management system associated with an electric vehicle, the method comprising:

controlling, when an ambient temperature is lower than a first preset threshold, a compressor, a first throttle, and an evaporator to communicate in sequence to form a first refrigerant circuit configured to refrigerate a passenger compartment in the electric vehicle;

controlling, when the ambient temperature is higher than a second preset threshold, the compressor and a second throttle to communicate with each other to form a second refrigerant circuit;

controlling a cooling water tank to communicate with a condenser to form a first cooling water circuit configured to cool a motor of the electric vehicle and the first refrigerant circuit; and controlling two ends of a cooler to form a second cooling water circuit between the two ends to cool a power battery of the electric vehicle, wherein, the cooling water tank is configured to cool the motor and the power battery, and the condenser is disposed between the compressor and the first throttle and between the compressor and the second throttle, and is able to exchange heat with the first refrigerant circuit and the second refrigerant circuit.

19. The method according to claim 18, further comprising:

controlling the cooler, the condenser, and the cooling water tank to communicate with each other to form a third cooling water circuit to cool the motor and the power battery.

20. The method according to claim 18, further comprising:

controlling, when the ambient temperature is lower than a third preset threshold, the first refrigerant circuit to become cut-off; and controlling the condenser and a heater core to communicate to form a second heating water circuit, where the heater core is configured to heat the passenger compartment.

* * * * *